(12) United States Patent
Yao et al.

(10) Patent No.: US 12,719,790 B2
(45) Date of Patent: Aug. 25, 2026

(54) DATA TRANSMISSION CONTROL METHOD AND APPARATUS

(71) Applicant: Huawei Technologies Co., Ltd., Shenzhen (CN)

(72) Inventors: Junda Yao, Beijing (CN); Zhibo Hu, Beijing (CN); Jie Dong, Beijing (CN); Xinjun Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 17/691,637

(22) Filed: Mar. 10, 2022

(65) Prior Publication Data

US 2022/0200893 A1 Jun. 23, 2022

Related U.S. Application Data

(63) Continuation of application No. PCT/CN2020/105671, filed on Jul. 30, 2020.

(30) Foreign Application Priority Data

Sep. 11, 2019 (CN) ........................ 201910860821.5
Nov. 22, 2019 (CN) ........................ 201911159775.2

(51) Int. Cl.
*H04L 12/723* (2013.01)
*H04L 12/46* (2006.01)
(Continued)

(52) U.S. Cl.
CPC .............. *H04L 45/74* (2013.01); *H04L 41/40* (2022.05); *H04L 45/021* (2013.01);
(Continued)

(58) Field of Classification Search
CPC ..... H04L 45/20; H04L 45/021; H04L 45/123; H04L 45/24; H04L 45/42; H04L 43/028;
(Continued)

(56) References Cited

U.S. PATENT DOCUMENTS 6,363,077 B1 3/2002 Wong et al.
7,336,611 B1 * 2/2008 Aweya .................. H04L 47/31 370/235

(Continued)

FOREIGN PATENT DOCUMENTS

CN 105075194 A 11/2015
CN 107517488 A 12/2017

(Continued)

OTHER PUBLICATIONS

Previdi, S., Ed, et al., "IS-IS Traffic Engineering (TE) Metric Extensions," RFC 7810, May 2016, 18 pages.

(Continued)

*Primary Examiner* — Umar Cheema
*Assistant Examiner* — Golam Mahmud
(74) *Attorney, Agent, or Firm* — Conley Rose, P.C.

(57) ABSTRACT

In a data transmission control method, one or more pieces of identification information are added to determine an interface resource object for forwarding a data packet on an interface of a network device. The added one or more pieces of identification information include one piece of global identification information. The global identification information may correspond to a network slice, and different network slices correspond to different values of global identification information. A global network identifier corresponds to one or more interface resource objects. One interface resource object may be occupied by one network slice alone, or one interface resource object may be jointly shared by a plurality of network slices.

28 Claims, 19 Drawing Sheets

| 0 | 4 | 8 | 16 | 19 | 24 | 31 |
|---|---|---|---|---|---|---|
| Version | Header length | Differentiated service (ToS) | Total length | | | |
| Identification | | | Flags | Fragment offset | | |
| Time to live | | Protocol | Header checksum | | | |
| Source address | | | | | | |
| Destination address | | | | | | |
| Type (type) | | Length (length) | SDGP-ID | | | |
| Data part | | | | | | |

Row offsets: 4, 8, 12, 16, 20

(51) Int. Cl.

| | |
|---|---|
| ***H04L 12/715*** | (2013.01) |
| ***H04L 12/721*** | (2013.01) |
| ***H04L 12/733*** | (2013.01) |
| ***H04L 12/741*** | (2013.01) |
| ***H04L 41/40*** | (2022.01) |
| ***H04L 45/00*** | (2022.01) |
| ***H04L 45/021*** | (2022.01) |
| ***H04L 45/12*** | (2022.01) |
| ***H04L 45/24*** | (2022.01) |
| ***H04L 45/42*** | (2022.01) |
| ***H04L 45/74*** | (2022.01) |
| ***H04L 45/745*** | (2022.01) |

(52) U.S. Cl.
CPC ............ *H04L 45/123* (2013.01); *H04L 45/20* (2013.01); *H04L 45/24* (2013.01); *H04L 45/42* (2013.01); *H04L 45/745* (2013.01)

(58) Field of Classification Search
CPC ..... H04L 41/40; H04L 41/5054; H04L 45/38; H04L 45/64; H04L 45/745; H04L 45/74; H04L 45/50; H04L 45/30; H04L 45/54; H04L 45/741; H04L 41/0806; H04L 41/12; H04L 41/5009; H04L 43/08
See application file for complete search history.

(56) References Cited

U.S. PATENT DOCUMENTS

| | | | | |
|---|---|---|---|---|
| 7,535,900 | B2 * | 5/2009 | Shenoi | H04L 65/80 370/395.21 |
| 9,559,954 | B2 * | 1/2017 | Filsfils | H04L 45/54 |
| 9,949,238 | B2 * | 4/2018 | Chen | H04W 28/16 |
| 10,432,523 | B2 * | 10/2019 | Vairavakkalai | H04L 45/122 |
| 10,476,795 | B2 * | 11/2019 | Huang | H04L 61/256 |
| 2004/0125797 | A1 * | 7/2004 | Raisanen | H04L 63/1466 370/392 |
| 2006/0002370 | A1 * | 1/2006 | Rabie | H04L 45/30 370/389 |
| 2007/0189180 | A1 * | 8/2007 | Schelen | H04L 41/5009 370/255 |
| 2008/0025218 | A1 * | 1/2008 | Liu | H04L 69/161 370/254 |
| 2010/0195649 | A1 * | 8/2010 | Miyata | H04L 45/24 370/390 |
| 2011/0205909 | A1 * | 8/2011 | Cao | H04L 45/02 370/248 |
| 2012/0069845 | A1 * | 3/2012 | Carney | H04L 63/1466 370/392 |
| 2014/0254596 | A1 * | 9/2014 | Filsfils | H04L 45/50 370/392 |
| 2016/0112344 | A1 * | 4/2016 | Chen | H04L 63/10 709/225 |
| 2016/0142293 | A1 * | 5/2016 | Hu | H04L 45/745 370/392 |
| 2017/0122751 | A1 * | 5/2017 | Li | G01C 21/3893 |
| 2017/0302546 | A1 * | 10/2017 | Zheng | H04L 43/00 |
| 2017/0367036 | A1 * | 12/2017 | Chen | H04L 43/10 |
| 2018/0198705 | A1 * | 7/2018 | Wang | H04L 45/50 |
| 2018/0270743 | A1 | 9/2018 | Callard et al. | |
| 2019/0082037 | A1 * | 3/2019 | Matsumoto | H04L 69/161 |
| 2019/0124704 | A1 | 4/2019 | Sun et al. | |
| 2019/0140904 | A1 | 5/2019 | Huang et al. | |
| 2019/0260677 | A1 * | 8/2019 | Zheng | H04L 45/741 |
| 2019/0289528 | A1 * | 9/2019 | Lou | H04W 36/06 |
| 2019/0313443 | A1 * | 10/2019 | Li | H04W 72/23 |
| 2019/0349295 | A1 | 11/2019 | Huang et al. | |
| 2020/0169921 | A1 | 5/2020 | Zhu et al. | |
| 2020/0244591 | A1 | 7/2020 | Meng et al. | |
| 2020/0287826 | A1 | 9/2020 | Wang | |
| 2020/0322867 | A1 | 10/2020 | Li et al. | |
| 2021/0377155 | A1 | 12/2021 | Chen et al. | |
| 2022/0045944 | A1 * | 2/2022 | Sun | H04L 5/0091 |

FOREIGN PATENT DOCUMENTS

| | | | | |
|---|---|---|---|---|
| CN | 107659419 A | | 2/2018 | |
| CN | 108075956 A | | 5/2018 | |
| CN | 108307423 A | | 7/2018 | |
| CN | 109391563 A | | 2/2019 | |
| CN | 109391648 A | | 2/2019 | |
| CN | 109831382 A | | 5/2019 | |
| CN | 109861926 A | | 6/2019 | |
| CN | 109891832 A | | 6/2019 | |
| CN | 109996307 A | | 7/2019 | |
| EP | 2925074 A1 | | 9/2015 | |
| EP | 3471341 A1 | | 4/2019 | |
| EP | 3506718 A1 | | 7/2019 | |
| WO | WO-2017162095 A1 | * | 9/2017 | H04L 69/325 |
| WO | 2019096380 A1 | | 5/2019 | |

OTHER PUBLICATIONS

Dong, J., et al., "A Framework for Enhanced Virtual Private Networks (VPN+) Service," draft-ietf-teas-enhanced-vpn-00, Jan. 15, 2019, 36 pages.
Peng, S., et al., "Packet Network Slicing using Segment Routing," draft-peng-lsr-network-slicing-00, Feb. 25, 2019, 14 pages.
Li, T., et al. "IS-IS Extensions for Traffic Engineering," RFC 5305, Oct. 2008, 17 pages.
Peng, Shaofu et al., "Packet Network Slicing using Segment Routing," draft-peng-teas-network-slicing-00, XP015134808, Aug. 20, 2019, 15 pages.
N. Bahadur, Ed et al., "Routing Information Base Info Model," draft-ietf-i2rs-rib-info-model-09, Jul. 7, 2016, 25 pages.
Yuto Nagayama et al., Resource Isolation by Diffserve in Network Slicing based on ID/Locator Separation and. Locator Division, Information Processing Society of Japan Symposium Series, Multimedia, Distributed, Cooperative, and Mobile Symposium (DICOMO2019) [CD-ROM], Information Processing Society of Japan, vol. 2019, First Edition, Jun. 26, 2019, 15 pages.
Psenak, et al., "IGP Flexible Algorithm," Jul. 4, 2019, 31 pages.
K. Nicholas, et al., Definition of the Differentiated Services Field (DS Field) in the IPV4 and IPV6 Headers, RFC 2474, Dec. 1998, 20 pages.
Wang Qiang et al., Architecture and Key Technologies of 5G Transport Network Slicing, ZTE Technology Journal, Feb. 2018, with the English abstract, 4 pages.

* cited by examiner 0 4 8 12 16 20 24 28 31

Version
TC
Flow label
Payload length
Next header
Hop limit
64
Source address
192
Destination address
320
...

ETH

TunnelL label/VPN label

Reserved label

SDGP label

Payload region

Flow label field 0 4 8 12 16 20 24 28 31

Version

TC

Flow label information

SDGP-ID

Payload length

Next header

Hop limit

64

Source address (A1::1)

192

Destination address (128 bits)

DATA TRANSMISSION CONTROL METHOD AND APPARATUS

CROSS-REFERENCE TO RELATED APPLICATIONS

This is a continuation of Int'l Patent App. No. PCT/CN2020/105671, filed on Jul. 30, 2020, which claims priority to Chinese Patent App. No. 201910860821.5, filed on Sep. 11, 2019, and Chinese Patent App. No. 201911159775.2, filed on Nov. 22, 2019, all of which are incorporated by reference.

FIELD

Embodiments of this disclosure relate to the field of communication technologies, and in particular, to a data transmission control method and apparatus.

BACKGROUND

Currently, during service flow forwarding, a network device usually searches for a next-hop network device based on a destination address in a data packet, and then forwards the data packet to the next-hop network device. However, the network device may have a plurality of interfaces for communicating with the next-hop network device. In this case, the network device usually randomly selects an interface or selects an interface based on an activity status of the interface to forward a data packet to the next-hop network device. Consequently, forwarding resources cannot be isolated for different service flows, and some interfaces may remain unselected, resulting in a waste of interface resources.

SUMMARY

Embodiments provide a data transmission control method and apparatus, to resolve a problem of a waste of interface resources.

According to a first aspect, an embodiment provides a data transmission control method. In the method, a first network device obtains a first data packet that carries a destination address and first identification information. The first network device then determines a target interface based on the destination address. The target interface is an interface that exists on the first network device and that is configured to connect to a second network device. The second network device is a next-hop network device of the first network device. Further, the first network device determines at least one interface resource object on the target interface based on the first identification information, and forwards the first data packet to the second network device by using the at least one interface resource object.

In this embodiment, the first identification information may be referred to as a self-defined global policy identifier (SDGP ID). The SDGP ID has global significance, and is used to select a forwarding resource (an interface resource object). It may be understood that the global identification information may be alternatively named another name. Different values of the first identification information may correspond to different network slices.

In the foregoing solution, after a forwarding path is determined, in other words, after the target interface is determined, one or more interface resource objects that are on the target interface for forwarding are indicated by using the first identification information on a forwarding plane. Further, there is actually only one path between the two network devices. However, on the forwarding plane, different service flows actually correspond to different transmission paths. In this way, a topology path computation result is reused, and a waste of interface resources is reduced. The target interface may be a binding interface, and the interface resource object is a physical interface. In this case, the data packet is not forwarded by randomly selecting a sub-interface, but the first identification information is used to identify one or more interfaces to be used to forward the data packet. That is, a plurality of transmission paths for the data packet are planned based on all interfaces between the two network devices, to improve interface resource utilization.

The target interface may be a physical interface, and the interface resource object may be a physical sub-interface. Alternatively, the target interface may be a physical interface, and the interface resource object may be a logical sub-interface or a packet object. In this case, when there is only one physical interface between network devices, to improve interface resource utilization, a plurality of logical sub-interfaces or packet queues may be configured on the physical interface for the network device. Therefore, there are a plurality of transmission paths between the two network devices. During computation of the forwarding path on a control plane, the forwarding path may be determined only based on the physical interface. On the forwarding plane, different service flows actually correspond to different transmission paths. In this way, a topology path computation result is reused, and a waste of interface resources is reduced.

In a possible design, the first network device may determine the target interface based on the destination address in the following manner: The first network device determines the target interface identifier corresponding to the destination address based on a correspondence that is between the destination address and a target interface identifier and that is included in a routing and forwarding table. The target interface identifier is used to identify the target interface.

In a possible design, the first network device may determine the at least one interface resource object on the target interface based on the first identification information in the following manner: The first network device determines the first interface resource object corresponding to the first identification information based on a one-to-one mapping relationship between the first identification information and a first interface resource object on the target interface. In the foregoing design, there is the one-to-one mapping relationship between the first identification information and the first interface resource object, and different service flows are forwarded by using different interface resource objects. That is, different service flows are transmitted to the next-hop network device by using a plurality of transmission path between the two network devices, to implement isolation between transmission paths of different service flows.

In a scenario of application to a network slice, different interface resource objects may be used by different network slices. The target interface between the two network devices corresponds to a plurality of interface resource objects, and different interface resource objects may be used by different network slices. The interface resource objects are distinguished, that is, different network slices are distinguished, by using the first identification information. After different paths are computed by using a Flex-Algo ID, data plane forwarding resources between different network slices are isolated on the forwarding plane by using the first identification information. Further, there is actually only one path between the two network devices. However, on the forwarding plane, different data actually corresponds to different transmission paths. In this way, a topology path computation result is reused, and a waste of resources is reduced.

In a possible design, the first network device stores a first mapping and forwarding table, and the first mapping and forwarding table includes a correspondence between an identifier of the first interface resource object and each of the target interface identifier and the first identification information. Further, the first network device may determine the first interface resource object corresponding to the first identification information based on the mapping relationship in the following manner: The first network device determines, based on the first mapping and forwarding table, the identifier of the first interface resource object that corresponds to the first identification information and that is on the target interface identified by the target interface identifier. The identifier of the first interface resource object is used to identify the first interface resource object.

In a possible design, a first per-hop behavior (PHB) is used when the first interface resource object is used to forward a service flow, and that the first network device forwards the first data packet to the second network device by using the at least one interface resource object includes: After determining the first interface resource object corresponding to the first identification information based on the mapping relationship, the first network device forwards the first data packet to the second network device by using the first PHB and the first interface resource object.

In a possible design, there is a mapping relationship between the first identification information and N interface resource objects, where N is an integer greater than 1, and that the first network device determines at least one interface resource object on the target interface based on the first identification information includes: The first network device determines M interface resource objects to be used to forward a service flow to which the first data packet belongs from the N interface resource objects to which the first identification information is mapped, where M is a positive integer less than or equal to N.

In the foregoing design, the M interface resource objects to be used to forward the service flow to which the first data packet belongs are determined from N interface resource objects to which the first identification information is mapped. For example, the M interface resource objects to be used to forward the service flow to which the first data packet belongs may be determined from the plurality of interface resource objects to which the first identification information is mapped based on traffic of the service flow and bandwidth respectively corresponding to the N interface resource objects, to ensure quality of service of forwarding the service flow, and improve flexibility of forwarding the service flow.

For example, when the foregoing design is applied to a network slice scenario, different values of the first identification information correspond to different network slices. Different network slices may be respectively mapped to one or more interface resource objects in a plurality of interface resource objects on the first network device and the second network device. A same interface resource object may be shared by two or more network slices, to improve resource utilization.

In a possible design, before forwarding the data packet, the first network device receives a mapping relationship between an identifier of the network slice and the first identification information and a mapping relationship between the at least one interface resource object on the target interface on the first network device and the first identification information that are sent by a controller. The at least one interface resource object can be used by a network slice identified by a network slice identifier to which the at least one interface resource object is mapped.

In a possible design, a PHB used for forwarding the service flow is configured for each of the N interface resource objects, and that the first network device forwards the first data packet to the second network device by using the at least one interface resource object includes: After determining the M interface resource objects to be used to forward the service flow to which the first data packet belongs, the first network device forwards, by using the PHB configured for each of the M interface resource objects and the M interface resource objects, the service flow to which the first data packet belongs. A PHB is configured for each interface resource object corresponding to each value of the first identification information. A same interface resource object may be shared by two or more service flows, and the same interface resource object may use different PHBs for different service flows, to improve resource utilization.

In a possible design, for example, the first identification information corresponds to two interface resource objects. In other words, N is 2, and the first identification information corresponds to a primary interface resource object and a secondary interface resource object. The first network device may determine, in the following manner, the M interface resource objects to be used to forward the service flow to which the first data packet belongs from the N interface resource objects to which the first identification information is mapped: When determining that bandwidth of the primary interface resource object meets a traffic requirement of the service flow to which the first data packet belongs, the first network device determines that the primary interface resource object is to be used to forward the service flow to which the first data packet belongs.

Alternatively, when determining that bandwidth of the primary interface resource object does not meet a traffic requirement of the service flow to which the first data packet belongs, the first network device determines that the primary interface resource object and the secondary interface resource object are to be used to forward the service flow to which the first data packet belongs.

In a possible design, a second PHB is used when the primary interface resource object is used to forward the service flow, a third PHB is used when the secondary interface resource object is used to forward the service flow, and that the first network device forwards the first data packet to the second network device by using the at least one interface resource object includes: When determining that the primary interface resource object is to be used to forward the service flow to which the first data packet belongs, the first network device forwards the first data packet to the second network device by using the second PHB and the primary interface resource object, or when determining that the primary interface resource object and the secondary interface resource object are to be used to forward the service flow to which the first data packet belongs, the first network device forwards the first data packet to the second network device by using the second PHB and the primary interface resource object, or forwards the first data packet to the second network device by using the third PHB and the secondary interface resource object.

In a possible design, the second PHB is any one of expedited forwarding (EF), class selector (CS), assured forwarding (AF), and best-effort (BE), or the third PHB is any one of EF, CS, AF, and BE.

For example, when the first network device determines that the primary interface resource object and the secondary interface resource object are to be used to forward the service flow to which the first data packet belongs, the second PHB is the EF, and the third PHB is the AF, or the second PHB is the EF, and the third PHB is the BE.

In the foregoing design, when traffic of a service flow is greater than that of an interface resource object, expedited forwarding is used for most traffic, and after a service level is lowered for the remaining part of traffic, the remaining part of traffic may be forwarded by using an interface resource object shared with another service flow, to improve resource utilization.

In a possible design, the first network device may obtain the first data packet in the following manners: In one manner, the first network device receives a first data packet from a previous-hop network device of the first network device. In another manner, the first network device receives a first data packet from a terminal device. In this design, the first network device may be a headend network device in the forwarding path of the first data packet, or may be an intermediate network device in the forwarding path of the first data packet.

In a possible design, when the first network device is the headend network device in the forwarding path of the first data packet, the first network device may obtain the first data packet in the following manner: The first network device receives a second data packet, where the second data packet is associated with a first network slice; and then the first network device inserts the first identification information into the second data packet based on a correspondence between an identifier of the first network slice and the first identification information, to obtain the first data packet.

In a possible design, the target interface is a binding interface, and the binding interface is configured to establish a neighbor relationship between the first network device and the second network device.

In a possible design, a packet header of the first data packet includes the first identification information. For example, the packet header of the first data packet includes an extended type-length-value (TLV), and the extended TLV includes the first identification information. For another example, the first identification information is included in the packet header of the first data packet as an entropy label.

In a possible design, a packet header of the first data packet includes the destination address, the first identification information occupies K bits in the destination address, and K is a positive integer. For example, the K bits are K consecutive least significant bits in the destination address, or the K bits are K consecutive most significant bits in the destination address.

In a possible design, a packet header of the first data packet includes a traffic class field, and the traffic class field includes the first identification information.

In a possible design, a packet header of the first data packet includes a flow label, and the flow label includes the first identification information.

According to a second aspect, an embodiment further provides a data packet transmission control method, including: When creating a first network slice, a controller creates a mapping relationship between an identifier of the first network slice and first identification information and a mapping relationship between at least one interface resource object on a target interface on a first network device and the first identification information, where the first network slice can use the at least one interface resource object; and then the controller sends the mapping relationship between the identifier of the first network slice and the first identification information and the mapping relationship between the at least one interface resource object and the first identification information to the first network device.

In an example, a value of the first identification information is in a one-to-one correspondence with the interface resource object. That is, a different network slice occupies one interface resource object alone. In another example, one value of the first identification information may correspond to a plurality of interface resource objects. Different network slices correspond to different values of the first identification information, and different network slices share an interface resource object.

In a possible design, the controller configures a PHB for the at least one interface resource object to which the first identification information is mapped. For example, the controller configures different PHBs for a same interface resource object to which different values of the first identification information are mapped.

In a possible design, the target interface is a physical interface, and the interface resource object is a physical sub-interface, a logical sub-interface, or a packet queue, or the target interface is a binding interface, and the interface resource object is a physical interface.

According to a third aspect, an embodiment provides a data packet transmission control method, including: A first network device obtains a first data packet, where the first data packet carries routing information and first identification information; the first network device determines a target interface based on the routing information, where the target interface is an interface that exists on the first network device and that is configured to connect to a second network device, and the second network device is a next-hop network device of the first network device; the first network device determines at least one interface resource object on the target interface based on the first identification information; and the first network device forwards the first data packet to the second network device by using the at least one interface resource object.

In a possible design, the routing information is a destination address.

In a possible design, a packet header of the first data packet includes the destination address and the first identification information.

In a possible design, the packet header of the first data packet includes an extended TLV, and the extended TLV includes the destination address and the first identification information.

In a possible design, the first identification information is included in the packet header of the first data packet as an entropy label.

In a possible design, a packet header of the first data packet includes a destination address, and the destination address includes the routing information and the first identification information.

In a possible design, the routing information occupies a most significant bit in the destination address, and the first identification information occupies a least significant bit in the destination address; or the routing information occupies a least significant bit in the destination address, and the first identification information occupies a most significant bit in the destination address.

In a possible design, a packet header of the first data packet includes a destination address and a traffic class field, and the traffic class field includes the first identification information.

In a possible design, a packet header of the first data packet includes a destination address and a flow label, and the flow label includes the first identification information.

According to a fourth aspect, an embodiment provides a data transmission control apparatus. The apparatus is applied to the first network device in the first aspect or the third aspect. That is, the apparatus may be the first network device, or may be a chip that can be applied to the first network device. The apparatus has a function of implementing each embodiment of the first aspect, or has a function of implementing each embodiment of the third aspect. The function may be implemented by hardware, or may be implemented by hardware by executing corresponding software. The hardware or the software includes one or more modules corresponding to the function.

According to a fifth aspect, based on the same concept as that of the method embodiment provided in the second aspect, an embodiment provides a data transmission control apparatus. The apparatus is applied to the controller in the second aspect. That is, the apparatus may be the controller, or may be a chip that can be applied to the controller. The apparatus has a function of implementing each embodiment of the second aspect. The function may be implemented by hardware, or may be implemented by hardware by executing corresponding software. The hardware or the software includes one or more modules corresponding to the function.

According to a sixth aspect, an embodiment provides a network device, including a processor and a communication interface. The communication interface is configured to receive a communication message. The processor communicates with the communication interface, and performs the data transmission control method in any one of the first aspect or the implementation methods of the first aspect or the data transmission control method in any implementation method of the third aspect by using the communication message received by the communication interface. Optionally, the network device further includes a memory. The memory is configured to store instructions. When the network device runs, the processor executes the instructions stored in the memory, so that the network device performs the data transmission control method in any one of the first aspect or the implementation methods of the first aspect, or the network device performs the data transmission control method in any one of the third aspect or the implementation methods of the third aspect. It should be noted that the memory may be disposed outside the network device. In addition, when the memory is located in the network device, the memory may be integrated into the processor, or may be independent of the processor. The network device may further include a bus. The processor is coupled to the communication interface by using the bus. The memory may include a readable memory and a random access memory.

According to a seventh aspect, an embodiment provides a controller, including a processor and a communication interface. The communication interface is configured to receive a communication message. The processor communicates with the communication interface, and performs the data transmission control method in any one of the second aspect or the implementation methods of the second aspect by using the communication message received by the communication interface. Optionally, the controller further includes a memory. The memory is configured to store instructions. When the controller runs, the processor executes the instructions stored in the memory, so that the controller performs the data transmission control method in any one of the second aspect or the implementation methods of the second aspect. It should be noted that the memory may be disposed outside the controller. In addition, when the memory is located in the controller, the memory may be integrated into the processor, or may be independent of the processor. The controller may further include a bus. The processor is coupled to the communication interface by using the bus. The memory may include a readable memory and a random access memory.

According to an eighth aspect, an embodiment further provides a system, including the apparatus according to the fourth aspect and the apparatus according to the fifth aspect, or including the network device according to the sixth aspect and the controller according to the seventh aspect. In a possible design, the system may further include another network device that interacts with the two network devices in the solutions provided in the embodiments, for example, another network device, namely, a second network device, in a transmission path.

According to a ninth aspect, an embodiment further provides a readable storage medium. The readable storage medium stores a program or instructions. When the program or the instructions is or are run on a computer, the data transmission control method in any one of the foregoing aspects is performed.

According to a tenth aspect, an embodiment further provides a computer program product that includes instructions. When the computer program product is run on a computer, the computer is enabled to perform the data transmission control method in any one of the foregoing aspects.

In addition, for technical effects brought by any design manner of the third aspect to the ninth aspect, refer to the technical effects brought by different implementations of the first aspect and the second aspect. Details are not described herein.

DETAILED DESCRIPTION

Figure 1:
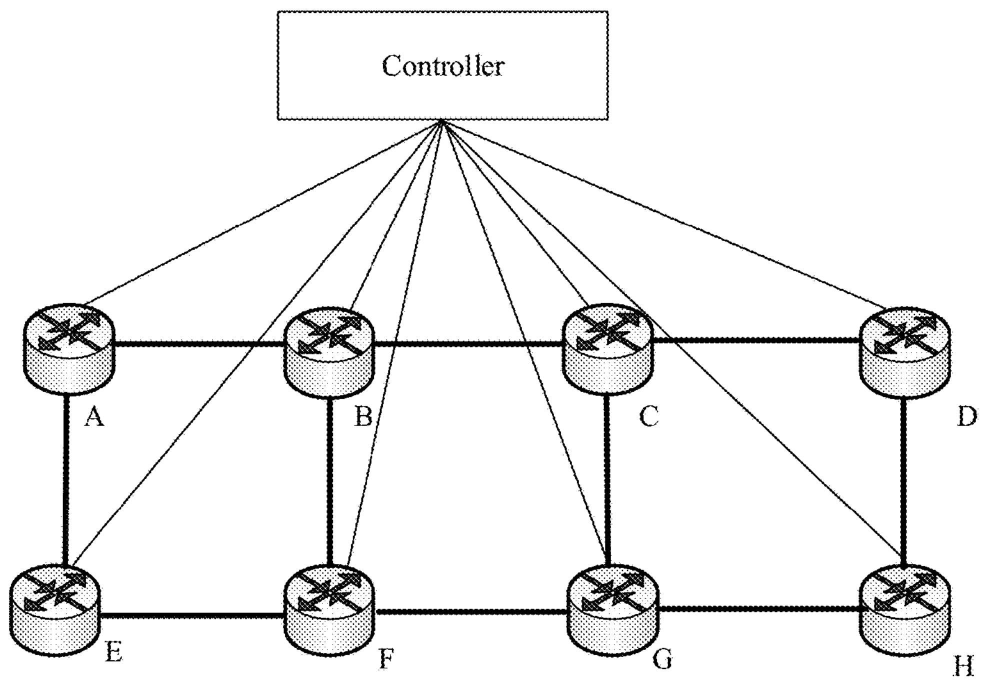
FIG. 1 is a schematic architectural diagram of a network system according to an embodiment.

The embodiments may be applied to a network system that includes a controller and a network device, as shown in FIG. 1. The network device may also be referred to as a node, and is a device that provides a routing and forwarding function in the network system. For example, the network device may be a router, a switch, a forwarder, or a label-switching router (LSR). This is not limited. In FIG. 1, for example, the network system includes eight network devices: A, B, C, D, E, F, G, and H. It should be understood that a quantity of network devices included in the network system is not limited in the embodiments.

Before the embodiments are described, technical concepts in the embodiments are first described.

(1) Network Slice.

A concept of network slice is proposed in a 5th generation (5G) mobile communication technology system. One network slice meets a connection and communication service requirement of a specific type of use cases or one use case. The entire 5G system includes a large quantity of network slices that meet different connection capabilities. Currently, three types of network slices are defined in the 3rd Generation Partnership Project (3GPP) protocol: enhanced mobile broadband (eMBB), ultra-reliable and low-latency communications (uRLLC), and massive machine-type communications (mMTC). Each type of network slice is for a specific service type. For example, the eMBB slice type is used for a service with a high data rate and high mobility. The uRLLC slice may be used to process a communication scenario with high reliability and a low latency. The mMTC slice may be used for a service (for example, sensor and wearable device services) in which there are a large quantity of devices, a small amount of data, and infrequent access, and a latency is tolerable. As a user and a service have an increasingly high requirement on network service customization, different network services are further differentiated. With the in-depth research on and large-scale commercial deployment of a 5G communication network, there will be a significant increase in types of network slices in the foreseeable future.

(2) A service-level agreement (SLA) is an agreement signed by a user (for example, an individual, an enterprise, or a neighboring internet service provider (ISP) that performs service interaction with a service provider) and the service provider on how a service flow should be treated when being transferred in a network. The SLA includes many aspects such as a payment protocol. In the SLA, a technical description part is referred to as a service-level specification (SLS). A focus of the SLS is a traffic conditioning specification (TCS). In the TCS, detailed performance parameters of each service level are described, for example, an average rate, a peak rate, a committed burst size, and a maximum burst size. The TCS is a main basis for traffic conditioning in a differentiated service (DS) network.

(3) DS is a service model provided for quality of service (QoS). When network congestion occurs, the DS model differentially performs traffic conditioning and forwarding based on different service level agreements of services to resolve the congestion problem. Flexibility and high scalability of an Internet Protocol (IP) network are fully considered, a complex quality of service guarantee is converted into a single-hop behavior by using information carried in a packet, and no additional signaling interaction is required.

Figure 2:
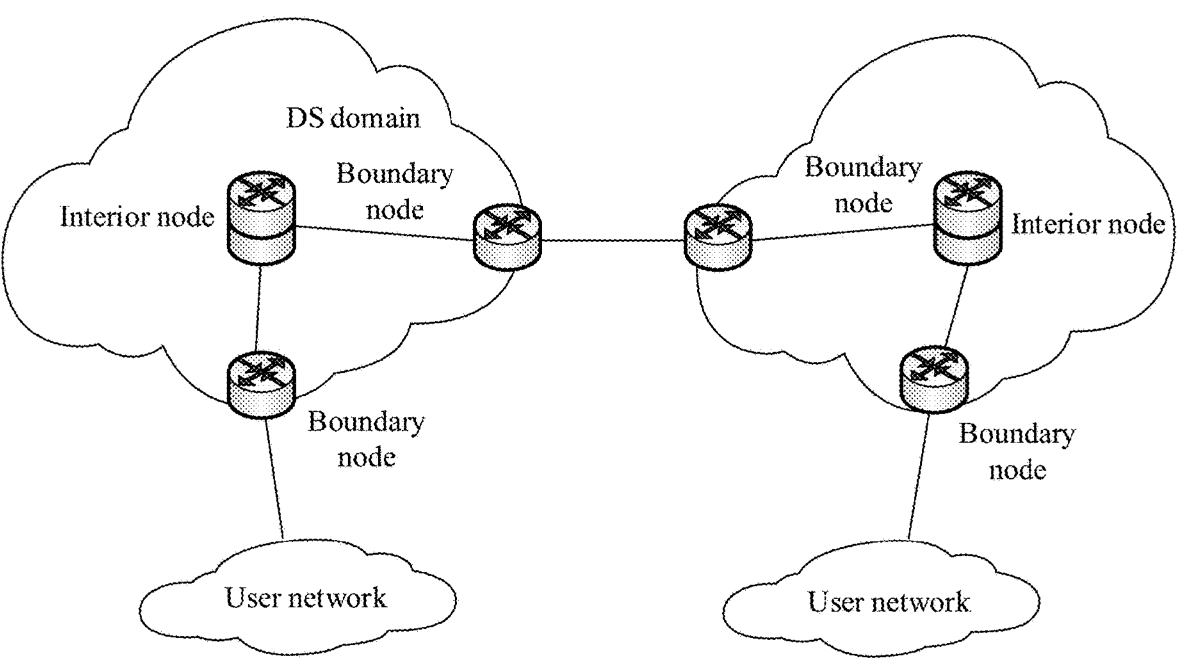
FIG. 2 is a schematic architectural diagram of a differentiated service according to an embodiment.

A basic idea of DS is to classify incoming flows into different types at an edge of the network, combine flows of a same type for unified management, ensure quality of service parameters such as a same transmission rate, latency, and jitter, and separately process each type of flow in the network. Service classification and convergence are performed by an edge node in the network. A data packet is first identified with a service type, and the service type is recorded in a packet header field. The packet is then sent to the network based on a specific traffic conditioning policy. An interior node in the network checks a packet header to determine how the packet will be processed. FIG. 2 shows an example of a DS network model. In FIG. 2, a network node configured to implement a DS function is referred to as a DS node. DS nodes may be classified into a DS boundary node and a DS interior node by function. The DS boundary node is a node responsible for connecting another DS domain or a domain without a DS function. The DS boundary node is responsible for classifying service flows that enter the DS domain and performing possible traffic conditioning on the service flows. The DS interior node is configured to connect to a DS boundary node and another interior node in a same DS domain. The DS interior node only needs to perform simple flow classification based on a differentiated services code point (DSCP) value, and perform traffic conditioning on a corresponding flow. The DS domain (DS domain) includes a group of connected DS nodes that use a same service provisioning policy and implement a same per-hop behavior (PHB). The DS domain includes one or more networks of a same management department. The DS domain may be an ISP or an intranet of an enterprise.

(4) A PHB may also be referred to as a hop-by-hop behavior. Different PHBs may be represented by using different DSCP values in IPv4 and IPv6 packets. The DSCP value is located in a type of service (ToS) field in an IPv4 packet header, and is located in a traffic class (TC) field in an IPv6 packet header.

Figures 3, 4:
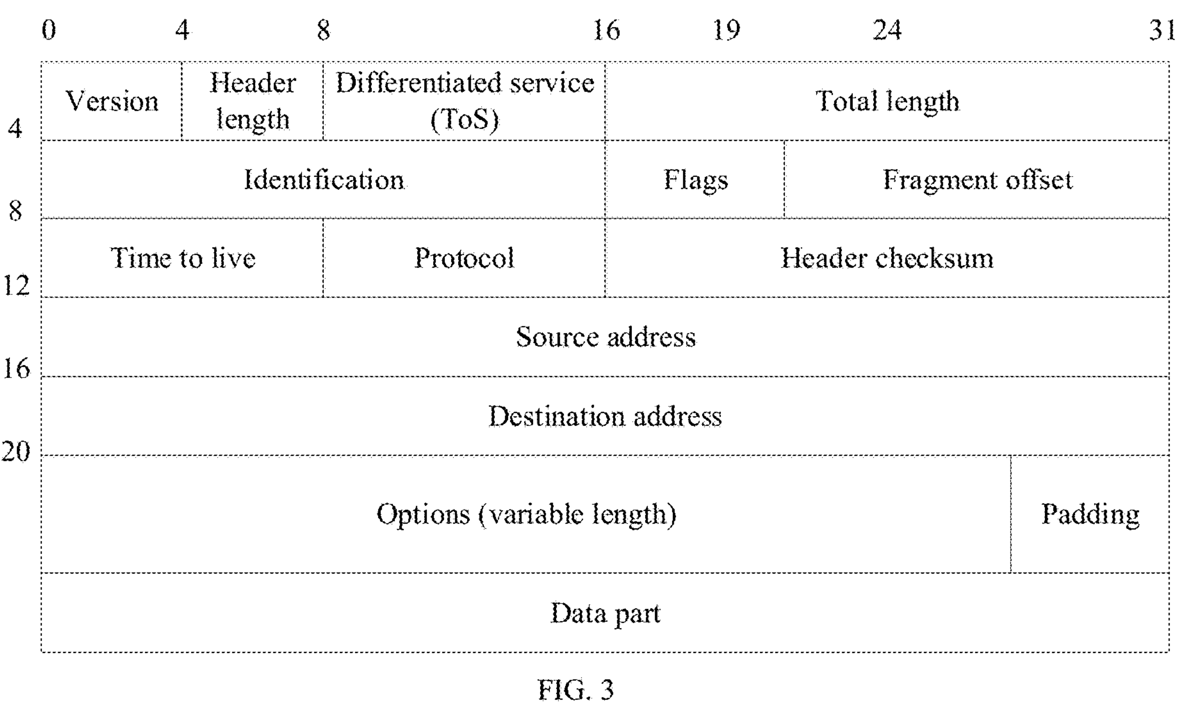
FIG. 3 is a schematic structural diagram of an Internet Protocol version 4 (IPv4) packet according to an embodiment.
FIG. 4 is a schematic structural diagram of an Internet Protocol version 6 (IPv6) packet according to an embodiment.

FIG. 3 shows an example of a format of the IPv4 packet. A version field in the IPv4 packet represents an IP version number of a data packet. A header length field represents a length of a packet header of the data packet. A total length field represents a total length of the data packet, and may be used to calculate a length of a payload in the data packet. An identification field has a length of 16 bits, and is usually used for data packet fragmentation with a flags field and a fragment offset field. If an original length of a data packet exceeds a maximum transmission unit (MTU) of a data link through which the data packet is to pass, the data packet needs to be fragmented into smaller data packets. For example, when a 5000-byte data packet passes through a network, if there is a data link whose MTU is 1500 bytes, that is, a data frame can accommodate a data packet having a maximum of 1500 bytes, a node needs to fragment the data packet into a plurality of data packets before data is framed, and a length of each data packet should not exceed 1500 bytes. A router then puts a same mark on identification fields of all the data packets, so that a receiving device can identify fragments that belong to the same data packet. A flags (e.g., IP flags) field has a length of 3 bits, and the first bit is not used. The second bit is a do-not-fragment (DF) bit, and the router cannot fragment a data packet after the second bit is set to 1. If the data packet exceeds an MTU value, the router cannot forward the data packet, but discards the data packet, and sends an error message to a source. A fragment offset field has a length of 13 bits, and is used to indicate an offset of a fragment start point relative to a header start point. Fragments may arrive out of order, and the fragment offset field may allow a receiver to reassemble a data packet in a correct order. A time to live field has a length of 8 bits, and is used to indicate a quantity of hops for transmission. A protocol field has a length of 8 bits, and indicates a protocol number of the data packet. A header checksum field is an error correction field for the IP packet header. A source address field and a destination address field respectively represent an IP address of a source node and an IP address of a destination node of the data packet. There is an options field, where a data part is data carried in the data packet.

FIG. 4 shows an example of a format of the IPv6 packet. Version in the IPv6 packet represents an IP version number of a data packet. A TC field is used to distinguish between services, and is used to identify a service type of the data packet. A flow label field is used to mark data packets that belong to a same service flow. The flow label, a source address, and a destination address uniquely identify a service flow together. All data packets in a same service flow have a same flow label, thereby facilitating processing on flows with a same QoS requirement. A payload length field includes a byte length of a payload of the data packet. A next header field specifies a protocol type in a next extension packet header field that follows an IPv6 basic header. A hop limit field usually has a length of 8 bits. Each time a node forwards the data packet once, a value of this field is decreased by 1. If the value of this field reaches 0, the data packet is discarded. The source address and the destination address respectively represent an IP address of a source node and an IP address of a destination node of the data packet.

The PHB describes an externally visible forwarding behavior used by a DS node for packets with a same DSCP. The PHB may be defined by a priority or by some visible service characteristics such as a packet latency, jitter, or a packet loss rate. The PHB defines only some externally visible forwarding behaviors, and does not specify a specific implementation. Currently, four types of PHBs are defined in a standard protocol: class selector (CS), EF, assured forwarding (AF), and best-effort (BE). BE is a default PHB.

A service level represented by CS is the same as an IP priority used in an existing network. EF is defined as such forwarding processing in which a rate of an information flow sent from any DS node needs to be greater than or equal to a specified rate in any case. The EF PHB cannot be re-marked in a DS domain, and is allowed to be re-marked only at a boundary node. AF meets the following requirement: When a user subscribes to a bandwidth service of an ISP, a traffic volume is allowed to exceed a subscribed specification. It is required to ensure forwarding quality for traffic that does not exceed the subscribed specification. Traffic that exceeds the specification is not simply discarded, but continues to be forwarded after a service level is lowered. BE corresponds to a conventional IP packet delivery service, only focuses on reachability, and poses no requirements on another aspect.

(5) Flexible Algorithm (Flex-Algo).

The Flex-Algorithm is defined in a P. Psenak, et al., "IGP Flexible Algorithm," draft-ietf-lsr-flex-algo-03, txt, Jul. 4, 2019, which is incorporated by reference. Currently, a best path may be computed (which may be referred to as path computation) by using an interior gateway protocol (IGP). The IGP is a protocol for exchanging routing information between gateways (a host and a router) in an autonomous network. In the IGP protocol, a best path in a network is computed based on an IGP metric allocated to a link. The IGP metric does not reflect a traffic requirement, and therefore the best path computed based on the IGP metric is usually replaced by a traffic engineering path. Various types of traffic engineering such as resource reservation protocol-traffic engineering (rRSVP-TE) or segment routing-traffic engineering (SR-TE) are deployed in many networks. In this case, it is forced in the network to compute the best path based on the RSVP-TE or the SR-TE by using a metric or a constraint of a shortest IGP path. In the Flex-Algorithm, it is proposed to define a combination of constraints to flood an IGP domain, so that nodes in the IGP domain compute constraint-based paths based on a same constraint, to implement distributed TE. A combination of constraints defined in each flexible algorithm may be represented by using a flexible algorithm ID. The flexible algorithm ID is a numeric identifier that ranges from 128 to 255, and is associated with a flexible algorithm definition (FAD) through configuration.

The FAD is a set that includes (a) a calculation type (Calc-Type), (b) a metric type (Metric-Type), and (c) a link constraint.

Metric-Type identifies a metric type used in a computation process of the Flex-Algorithm. When Metric-Type is 0, it indicates an IGP metric. When Metric-Type is 1, it indicates a minimum (min) unidirectional link delay. When Metric-Type is 2, it indicates a TE metric.

When Calc-Type is 0, it indicates a shortest path first (SPF). When Calc-Type is 1, it indicates a strict SPF.

The link constraint is described by using include/exclude admin-group (link color or simply color). The link color may also be referred to as an affinity attribute, and is a 32-bit vector that represents a link attribute. For example, the link color is used to represent link bandwidth, performance, or a management policy. Links in a same color correspond to a same link attribute. For example, if links are colored green, link attributes of different links colored green are the same.

Figure 5:
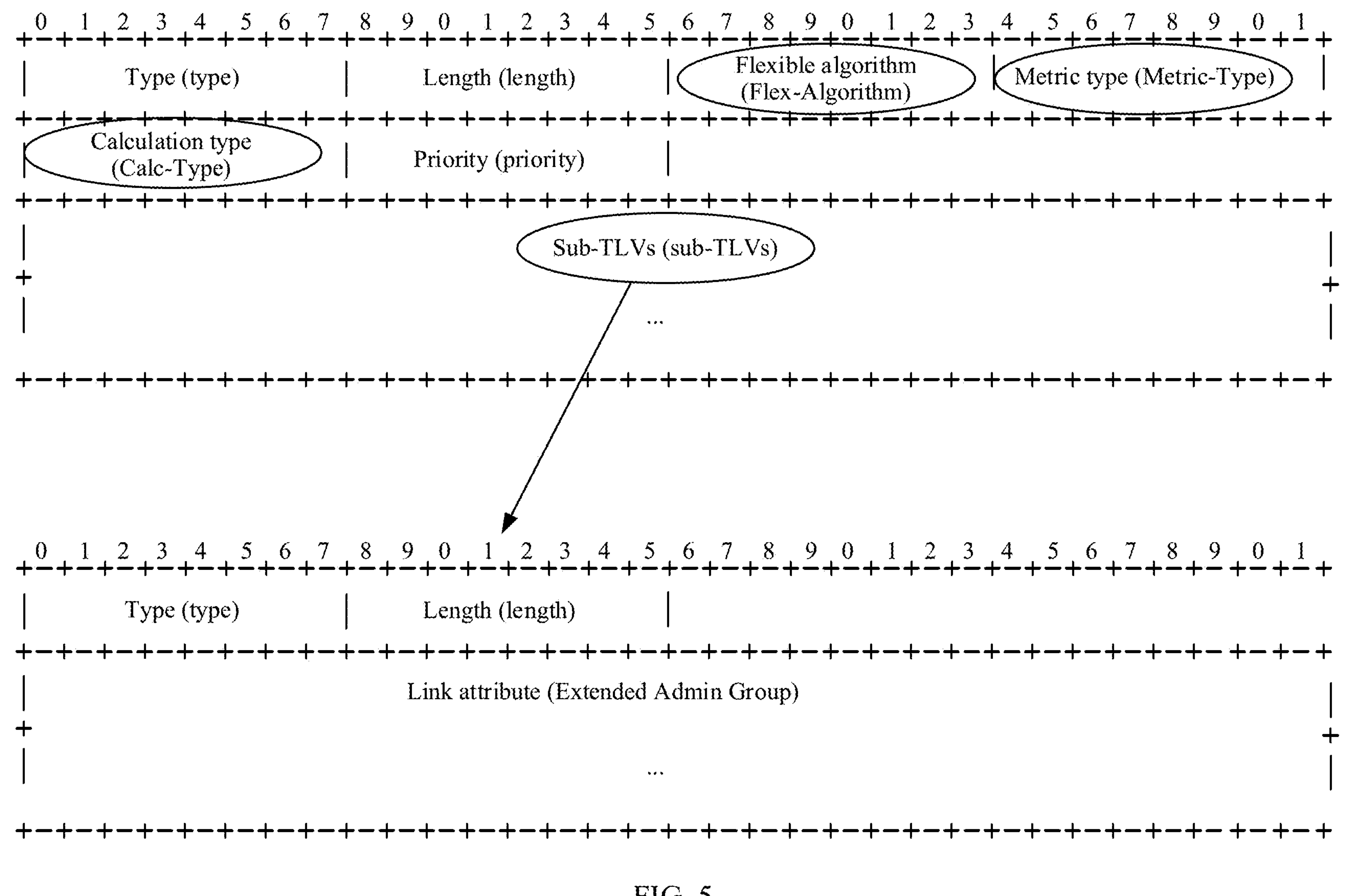
FIG. 5 is a schematic structural diagram of an ISIS FAD sub-TLV according to an embodiment.

For example, an ISIS FAD sub-TLV is used to carry content of the Flex-Algorithm definition. FIG. 5 is a schematic structural diagram of the ISIS FAD sub-TLV. In FIG. 5, a type field identifies a type of the TLV, a length field represents a byte length of the TLV, a Flex-Algorithm field identifies a flexible algorithm ID value, and a Metric-Type field identifies a metric type used in a computation process of the flexible algorithm. A Calc-Type field identifies a computation model defined for a specified IGP algorithm, and a metric and a constraint cannot be inherited. A priority field ranges from 0 to 255, and identifies a priority for advertising the TLV. A sub-TLVs field is optional. For example, different link attributes (e.g., color) may be configured for different links by adding Exclude Admin Group Sub-TLV, Include-Any Admin Group Sub-TLV, or Include-All Admin Group Sub-TLV to the sub-TLVs. Exclude Admin Group Sub-TLV is used to advertise a rule that is excluded during Flex-Algorithm path computation. Include-Any Admin Group Sub-TLV is used to advertise any rule that needs to be included during Flex-Algorithm path computation. Include-All Admin Group Sub-TLV is used to advertise all rules that need to be included during Flex-Algorithm path computation.

Currently, in a network slice scenario, a flexible algorithm technology may be used in combination with a network slice, and different network slices are distinguished by using different flexible algorithm IDs. That is, different constraint attributes are defined for different network slices, to forward different service flows in different network slices. When performing path computation based on an algorithm constraint identified by each flexible algorithm ID, a controller side needs to perform path computation based on the algorithm constraint identified by each flexible algorithm ID, compute a forwarding path, and generate a routing table. Even if different network slices correspond to a same forwarding device, a topology path computation result cannot be reused, resulting in a waste of interface resources.

In a non-network slice scenario, a network device may have a plurality of interfaces configured to communicate with a next-hop network device. In this case, the network device usually randomly selects an interface or selects an interface based on an activity status of the interface to forward a data packet to the next-hop network device. Consequently, forwarding resources cannot be isolated, and some interfaces may be idle, resulting in a waste of interface resources Based on this, the embodiments provide a data transmission control method and apparatus. One or more pieces of identification information are added, to determine an interface resource object, for forwarding a data packet, on an interface of a network device. The interface of the network device may be a physical interface or a binding interface obtained by combining a plurality of physical interfaces. The interface resource object may be a physical interface, a physical sub-interface, a logical sub-interface (for example, a channelized sub-interface or a Flex-E sub-interface), or a packet queue. Different interface resource objects may correspond to different interface forwarding resources.

In the following example, one piece of identification information is added to determine the interface resource object, for forwarding a data packet, on the interface of the network device. In the embodiments, one piece of global identification information is added, and the global identification information is used to select an interface resource object on an interface to forward a data packet. The global identification information may be referred to as first identification information, or may be referred to as an SDGP ID. The SDGP ID has global significance, and is used to select a forwarding resource. The global identification information may alternatively be named another name. This is not limited in the embodiments. In the embodiments, description is provided by using an example in which the global identification information is referred to as the SDGP ID. A controller creates a mapping relationship between different values of the SDGP ID and one or more interface resource objects. When a same value of the SDGP ID corresponds to a plurality of interface resource objects, a same interface resource object may correspond to a plurality of values of the SDGP-ID. Certainly, one interface resource object may correspond to one value of the SDGP-ID. After creating the mapping relationship between the different values of the SDGP ID and the one or more interface resource objects, the controller sends the mapping relationship to a network device side. A first network device on the network device side is used as an example. The first network device obtains a first data packet in a service flow, and then determines a target interface based on a destination address carried in the first data packet. The target interface is an interface that exists on the first network device and that is configured to connect to a second network device. The second network device is a next-hop network device of the first network device. The first network device then determines least one interface resource object on the target interface based on first identification information (SDGP-ID) carried in the first data packet, and further forwards the first data packet to the second network device by using the at least one interface resource object.

In the embodiments, when the SDGP ID is applied to a network slice technology of a bearer network, it may be defined as follows: Different values of the SDGP ID correspond to different network slices. Different network slices correspond to one or more interface resource objects, and one interface resource object may be used by one network slice, or may be used by a plurality of network slices. A scenario of application to a software-defined networking (SDN) network is used as an example. An interface resource object corresponding to a self-defined global policy identifier may be defined by an SDN controller and delivered to a network device side. In a data packet forwarding process, the self-defined global policy identifier is carried in a data packet, and the data packet further carries a destination address. A network device parses the data packet, determines, by using the destination address, an interface that exists on the network device and that is connected to a next-hop network device, and then selects an interface resource object on the interface based on the SDGP-ID, to forward a service flow. The data packet in the embodiments may be but is not limited to an IPv4 packet, a multi-protocol label switching (MPLS) packet, or an IPv6 packet.

In subsequent description, a scenario of application to a network slice is used as an example.

The following first provides description by using an example in which there is a one-to-one mapping relationship between an SDGP-ID and an interface resource object.

Figure 6:
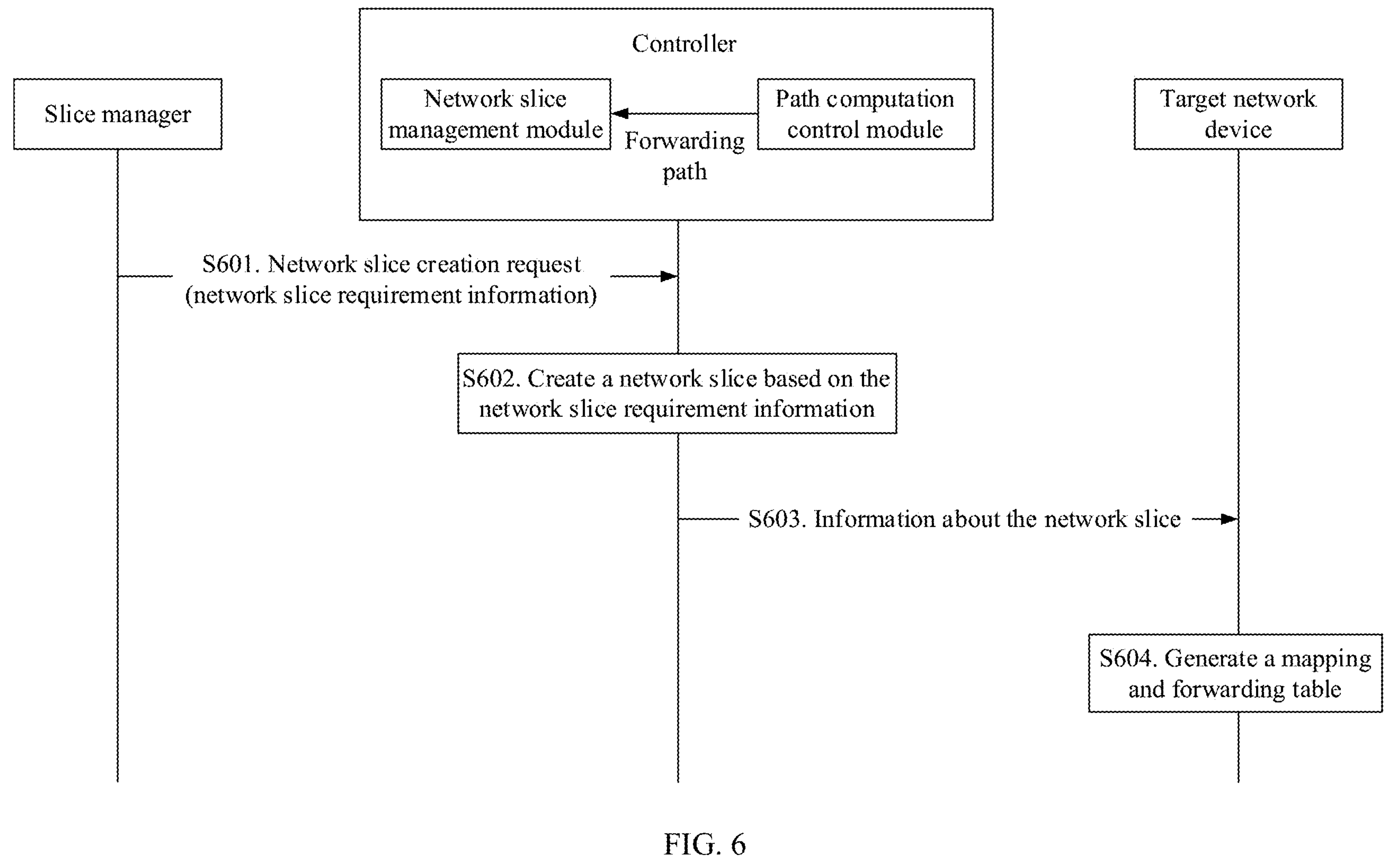
FIG. 6 is a schematic flowchart of creating a network slice according to an embodiment.

FIG. 6 is a schematic flowchart of delivering a mapping relationship between an SDGP-ID and an interface resource object by a controller in a network slice creation process.

S601. The controller receives a network slice creation request sent by a slice manager, where the network slice creation request may include network slice requirement information. For example, the network slice requirement information may include parameters such as a network slice name (e.g., network slicing ID), a network slice type, and an SLA requirement. When requesting to create a network slice, the slice manager may request to create one network slice at a time, or may request to create a plurality of network slices at a time.

S602. The controller creates a network slice based on the network slice requirement information. For example, the controller may include a network slice management module configured to create a network slice based on the network slice requirement information. Specifically, when a network topology created by the controller meets a requirement of the network slice, the controller may allocate the network topology to the network slice, and configure a multi-topology (MT) ID or a Flex-Algorithm ID for the network slice. If none of network topologies created by the controller meets the requirement of the network slice, the controller may create a network topology based on the network slice requirement information, and generate an MT-ID or a Flex-Algorithm ID. The controller further needs to configure an SDGP ID for the network slice, and allocate a corresponding interface resource object to the network slice. Different network slices correspond to different SDGP-IDs. For example, the interface resource object is a sub-interface on a network device. Different sub-interfaces are used as forwarding resources of different network slices, and different sub-interfaces correspond to different SDGP IDs.

It should be noted that the network topology may be obtained by using a Flex-algo technology or a multi-topology (MT) technology. An identifier of a network topology obtained by using the Flex-algo technology is referred to as a Flex-Algorithm ID, and an identifier of a network topology obtained by using the multi-topology technology is referred to as an MT-ID.

In subsequent description, an example in which the network topology is obtained by using the Flex-algo technology is used.

A network slice configuration model includes a network topology (e.g., MT-ID or Flex-Algorithm ID) and a global policy identifier (e.g., SDGP-ID). The network slice configuration model is delivered to the network device by using the controller or in a user-defined configuration manner. Each network device may flood the network slice configuration model in a network by advertising a network slicing TLV, to ensure that all the network devices in the network have a same network slice configuration model for network slices with a same network slicing ID. The network slicing TLV may be a top-level TLV, or may be used as a sub-TLV of a currently to-be-advertised TLV. For example, the network slicing TLV may be used as a sub-TLV of a router capabilities TLV. This is not limited in this embodiment.

For example, the network slice configuration model may be: Network-slicing ID: 1. Flex-Algorithm ID: 128; SDGP-ID: 100.

Figure 7:
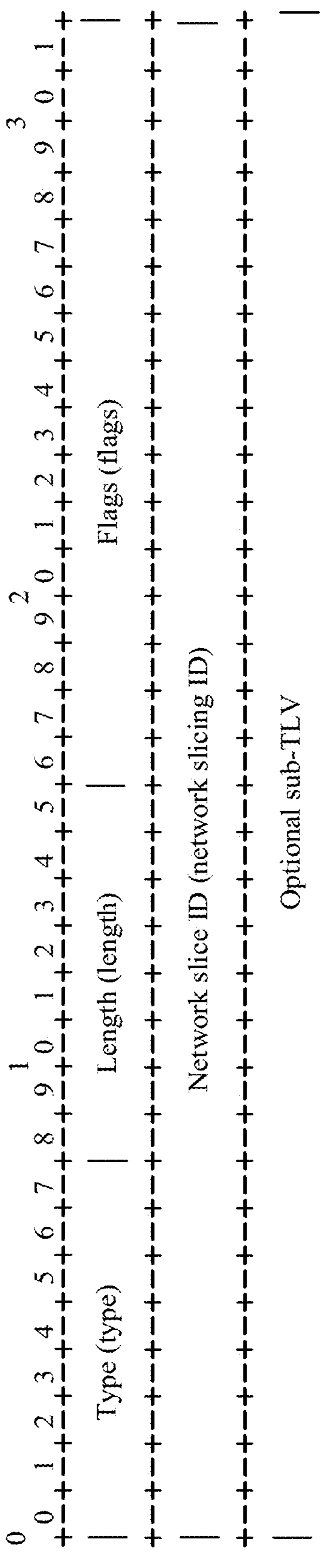
FIG. 7 is a schematic diagram of a format of a network slice TLV according to an embodiment.

FIG. 7 is a schematic diagram of a format of the network slicing TLV. In FIG. 7, Type represents a type of the TLV, Length represents a length of the TLV, Flags represents that there is no flag bit definition currently, and this is a reserved bit, Network-Slicing-ID represents a network slice identifier, and Optional sub-sub-TLVs represents a sub-TLV type included in the TLV of the network slice.

Figure 8:
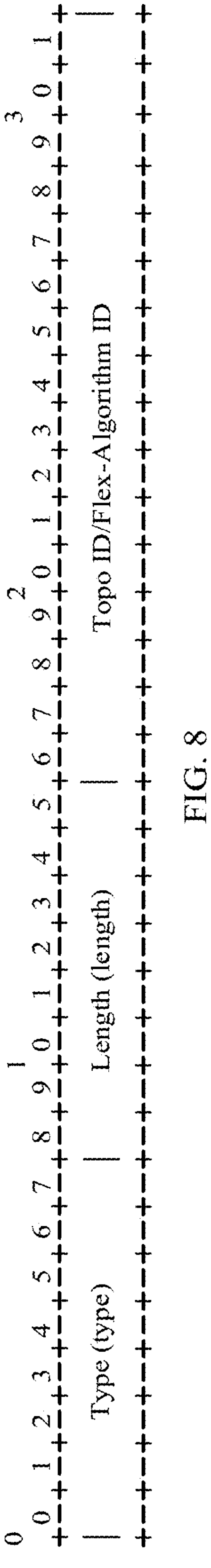
FIG. 8 is a schematic structural diagram of a Flex-Algorithm sub-TLV according to an embodiment.
Figure 9:
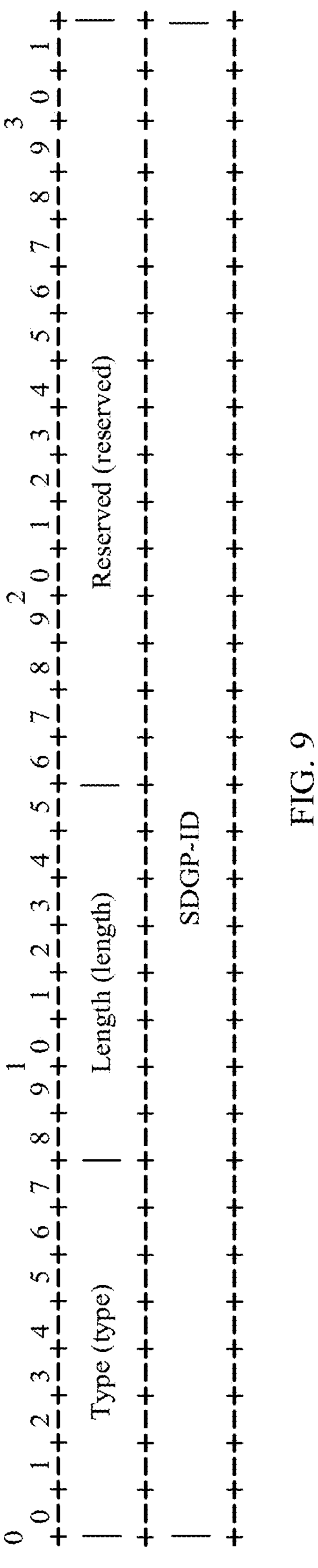
FIG. 9 is a schematic structural diagram of an SDGP-ID sub-TLV according to an embodiment.

For example, Optional sub-sub-TLVs may include a Topo sub-TLV/Flex-Algorithm sub-TLV, and an SDGP-ID sub-TLV. The Topo sub-TLV/Flex-Algorithm sub-TLV is used to carry a Flex-Algorithm ID, and the SDGP-ID sub-TLV is used to carry the SDGP-ID. FIG. 8 is a schematic structural diagram of the Topo sub-TLV/Flex-Algorithm sub-TLV. In FIG. 8, a Topo ID/Flex-Algorithm ID represents a network topology identifier. FIG. 9 is a schematic structural diagram of the SDGP-ID sub-TLV. In FIG. 9, Reserved represents a reserved bit.

S603. The controller sends information about the created network slice to a target network device. The target network device may be understood as a network device determined by the controller based on a network topology corresponding to the network slice. The controller determines a network topology corresponding to a network slice 1, as shown in FIG. 1, and the network topology includes A, B, C, D, E, F, G, and H. The controller may send information about the network slice 1 to an edge network device (for example, the network device A) in the network topology, and then the edge network device (for example, the network device A) may notify network devices (B, C, D, E, F, G, and H) in the network topology of the information about the network slice 1 in a flooding manner, that is, the edge network device is the target network device. The controller may send the information about the network slice 1 to each of network devices in the network topology that establish a connection to the controller. For example, if A, B, C, D, E, F, G, and H are all connected to the controller, the controller may send the information about the network slice 1 to A, B, C, D, E, F, G, and H. The information about the network slice includes the network topology, an SDGP-ID, and a correspondence between the SDGP ID and an interface resource object. There may be a one-to-one correspondence between the SDGP-ID and the interface resource object, or one SDGP-ID may correspond to two or more interface resource objects.

When a forwarding path is computed based on the network topology, an affinity attribute corresponding to the Flex-Algorithm ID, a metric type, and the like, the controller may perform path computation and send a path computation result to a headend network device. Alternatively, a headend network device may perform path computation and report a path computation result to the controller. The network device may allocate an adjacency label based on an IGP protocol, and report the allocated adjacency label to the controller, so that the controller generates, based on the adjacency label and the path computation result, a label stack list used to forward a data packet. After allocating the adjacency label, each network device floods the adjacency label in an entire network, so that each network device in the network learns, by using the IGP protocol, an adjacency label advertised by another network device, to determine a next-hop network device when forwarding a data packet.

The controller or the network device separately computes forwarding paths for different network topologies, that is, computes different forwarding paths for different Flex-Algorithm IDs. However, forwarding paths used by different network slices may be the same, that is, different network slices reuse a same network topology. Therefore, the controller/the network device needs to compute a forwarding path for different network slices of a same network topology only once. If the controller computes the forwarding path, the controller may further include a path computation control module. The path computation control module performs path computation based on different network topologies, and sends a path computation result to the network slice management module, to establish an association between the network slice and the forwarding path obtained through path computation. The network slice configuration model defines different SDGP-IDs to ensure data isolation on a forwarding plane. Two Flex-Algorithm IDs 128 and 129 are defined in FIG. 10, and different metric types are used as path attribute definitions for the two Flex-Algorithm IDs 128 and 129. For the Flex-Algorithm ID 128, an IGP metric is used as a path computation constraint, and for the Flex-Algorithm ID 129, a delay (e.g., link-delay) metric is used as a path computation constraint. Different segment routes are configured for different Flex-Algorithm IDs, and the segment routes are used to distinguish between network topologies. It is assumed that the two Flex-Algorithm IDs correspond to a same affinity attribute, that is, network topologies of the two Flex-Algorithm IDs are the same, that is, all network devices in the network. However, because the metric types for path computation are different, metric types for a same link are different, and therefore, path computation results of the two Flex-Algorithm IDs are different.

For example, the network slice is configured through Segment Routing over IPv6 (SRv6).

For the Flex-Algorithm ID 128, a shortest path from a node A to a node D is computed by using the IGP metric, and a path computation result is A→B→C→D.

For a definition of the Flex-Algorithm ID 128, refer to the following content:

Flex-Algo id 128:

Metric: igp-metric

Calc-type: 0

Link constraint: Affinity (affinity attribute). For example, if the link constraint is green, it indicates to exclude or include a green link when the Flex-Algorithm ID 128 is used for path computation.

For the Flex-Algorithm ID 129, a shortest path from the node A to the node D is computed by using the delay metric, and a path computation result is A→E→F→G→→D.

For a definition of the Flex-Algorithm ID 129, refer to the following content:

Flex-Algorithm ID 129:

Metric: link-delay-metric

Calc-type: 0

Link constraint: Affinity. For example, if the link constraint is purple, it indicates to exclude or include a purple link when the Flex-Algorithm ID 129 is used for path computation.

Figure 10:
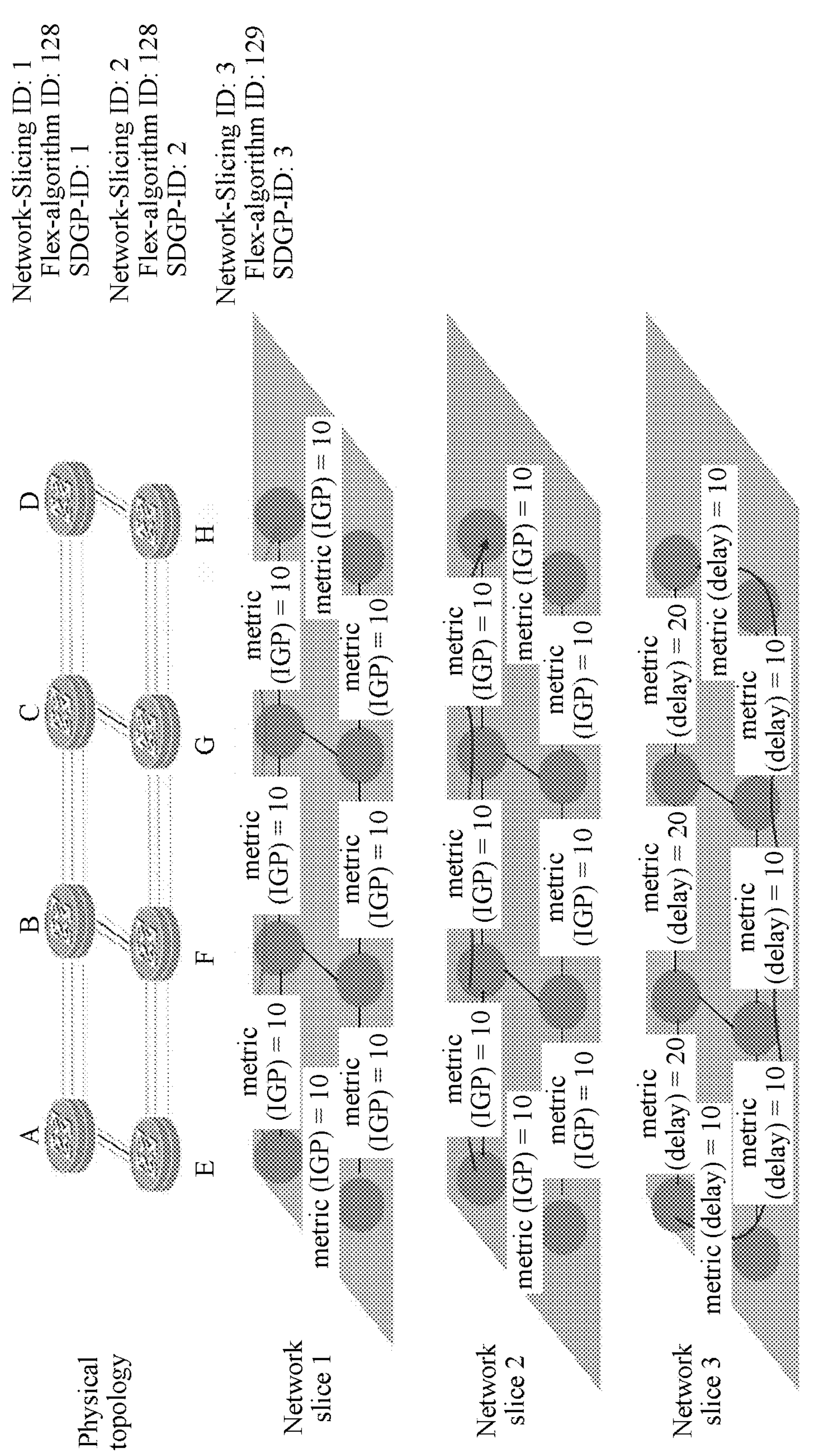
FIG. 10 is a schematic diagram of a forwarding path corresponding to a network slice according to an embodiment.

Referring to FIG. 10, three network slices are used as an example:

Network slice 1: Network Slicing ID: 1; Flex-Algorithm ID: 128; SDGP-ID: 1.

Network slice 2: Network Slicing ID: 2; Flex-Algorithm ID: 128; SDGP-ID: 2.

Network slice 3: Network Slicing ID: 3; Flex-Algorithm ID: 129; SDGP-ID: 3.

The network slice 1 and the network slice 2 use the same Flex-Algorithm ID 128. Therefore, topologies of the network slice 1 and the network slice 2 are the same, and path computation results are the same on a control plane. However, the SDGP IDs are different, and therefore data isolation can be implemented on a forwarding plane. The Flex-Algorithm ID of the network slice 3 is different from those of the network slice 1 and the network slice 2, and path computation is performed by using a delay metric value for the network slice 3. Therefore, a path computation result on the control plane is different from the path computation results of the network slice 1 and the network slice 2 that are obtained through path computation by using the IGP metric.

S604. The network device generates a mapping and forwarding based on the correspondence that is between the SDGP ID and the interface resource object and that is delivered by the controller.

Referring to FIG. 10, forwarding resources corresponding to the three network slices are shown by arrows. The three different network slices use different SDGP-IDs, and therefore interface resource objects identified by the SDGP-IDs are different. The controller delivers a mapping relationship between the SDGP-ID and the interface resource object to the network device, so that the network device generates the mapping and forwarding. For example, the interface resource object is a sub-interface. For example, there are a plurality of sub-interfaces between a network device A and a network device B.

Figure 11:
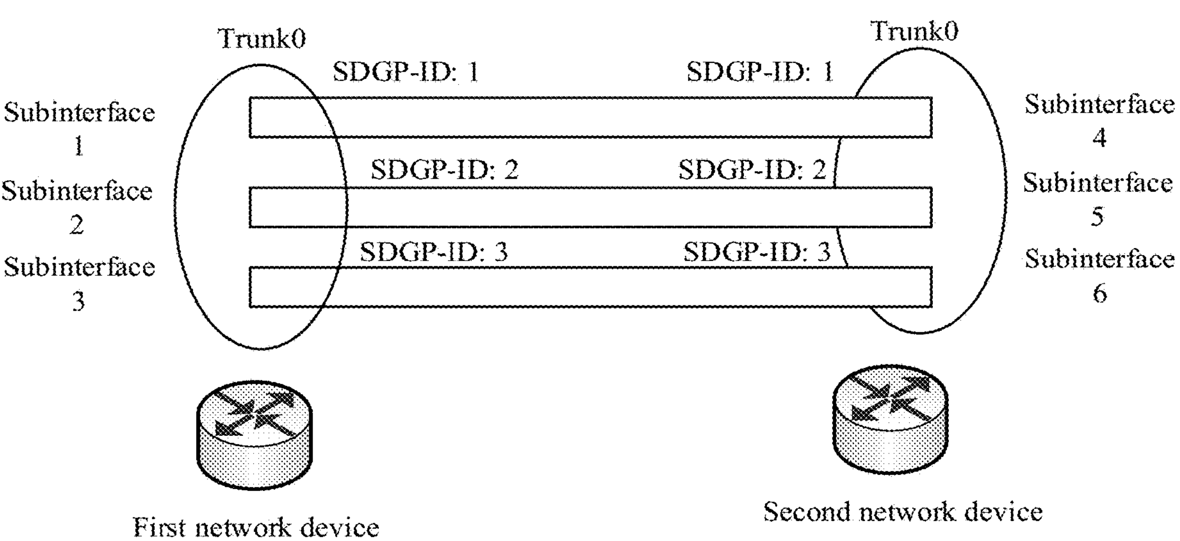
FIG. 11 is a schematic diagram of a mapping relationship between an SDGP-ID and a sub-interface according to an embodiment.

There are a plurality of sub-interfaces between the network device A and the network device B. Referring to FIG. 11, three sub-interfaces are used as an example. A mapping and forwarding between an SDGP-ID and a sub-interface needs to be established. For example, a plurality of sub-interfaces may form a binding interface, for example, a trunk interface. Specifically, the controller may construct the binding interface by using a trunk set model. In the trunk set model, a corresponding sub-interface in the binding interface may be indexed based on an attribute (for example, bandwidth) configured for the sub-interface in the binding interface. The trunk interface works at a layer 3 (a layer 3 IP is configured and an IGP neighbor relationship is established). The sub-interface works at a layer 2 (no IP is configured). The IGP neighbor relationship is established between network devices based on the trunk interface instead of the actual sub-interfaces. In this case, a quantity of adjacencies that need to be maintained by using an IGP routing protocol can be reduced when there are parallel links between neighbors. The IGP neighbor relationship is established only based on the trunk interface, for example, an IGP neighbor relationship established based on the trunk interface in FIG. 11. On a forwarding plane of the network device A, a mapping and forwarding is generated and maintained based on a relationship between the sub-interface and each of the trunk interface and the SDGP-ID, as shown in Table 1.

TABLE 1

| Out-interface (outbound interface) | SDGP-ID | Sub-interface |
|---|---|---|
| Trunk0 interface (A) | 1 | Interface 1 |
| Trunk0 interface (A) | 2 | Interface 2 |
| Trunk0 interface (A) | 3 | Interface 3 |

It should be understood that identifiers of trunk interfaces configured between different network devices are different. For example, a trunk interface between the network device A and the network device B is referred to as a Trunk0 interface, and an identifier is A. For example, a trunk interface between the network device A and the network device E may be referred to as a Trunk1 interface, and an identifier is B. When delivering the information about the network slice to the network device, the controller may notify the network device of the identifier of the trunk interface and the sub-interfaces included in the trunk interface indicated by the identifier of the trunk interface.

In an example, the SDGP-ID and the sub-interface are not limited to a one-to-one correspondence, and one SDGP-ID may correspond to two or more sub-interfaces. During forwarding of a service flow, the service flow may be forwarded in an offloading manner. That is, the service flow is forwarded by using a plurality of sub-interfaces corresponding to the SDGP-ID.

Figure 12:
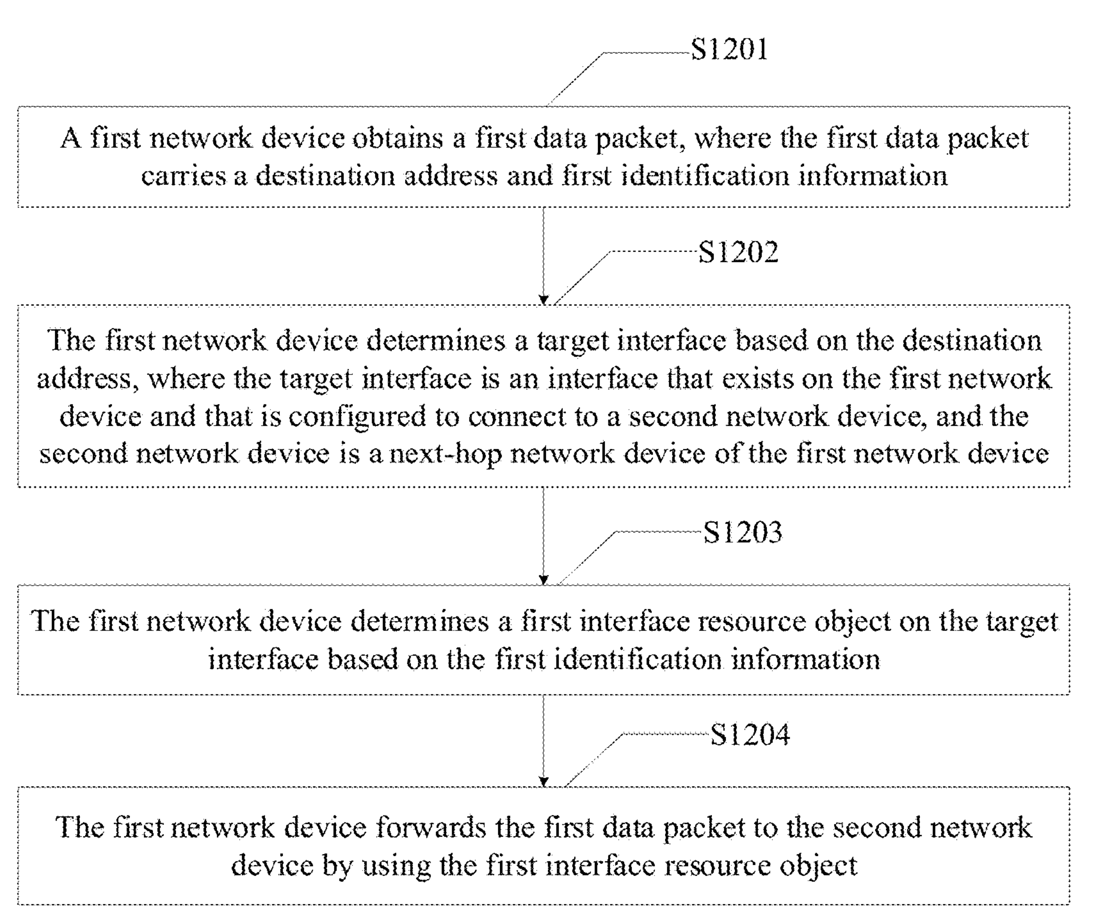
FIG. 12 is a schematic diagram of a data packet forwarding procedure according to an embodiment.

When the SDGP-ID is in a one-to-one correspondence with the interface resource object, a procedure of forwarding a service flow by the network device is shown in FIG. 12.

S1201. A first network device obtains a first data packet, where the first data packet carries a destination address and first identification information. The first data packet is any data packet in a service flow.

S1202. The first network device determines a target interface based on the destination address, where the target interface is an interface that exists on the first network device and that is configured to connect to a second network device, and the second network device is a next-hop network device of the first network device.

In a network topology, there may be a plurality of network devices connected to the first network device, and the first network device is connected to different network devices through different interfaces. The first network device can determine, by using the destination address, the next-hop network device (namely, the second network device) for forwarding the service flow, that is, the target interface is an interface that exists on the first network device and that is configured to connect to the second network device.

For example, when determining the target interface based on the destination address, the first network device may determine a target interface identifier corresponding to the destination address based on a routing and forwarding table, where the target interface identifier is used to identify the target interface, to determine the target interface. The routing and forwarding table includes a correspondence between the destination address and the target interface identifier. The target interface identifier indicates the next-hop network device in a forwarding path of the first data packet.

S1203. The first network device determines a first interface resource object on the target interface based on the first identification information.

For example, there is a one-to-one mapping relationship between the first identification information and the first interface resource object on the target interface. The mapping relationship may be stored in the first network device, so that the first network device can determine the first interface resource object on the target interface based on the first identification information. For example, there are a plurality of interface resource objects on the target interface. For example, the target interface is a binding interface. The binding interface includes a plurality of sub-interfaces, and the interface resource object is a sub-interface. In this case, the first network device determines a sub-interface to which the first identification information is mapped from the plurality of sub-interfaces included in the binding interface, to forward the first data packet.

When storing the one-to-one mapping relationship between the first identification information and the first interface resource object on the target interface, the first network device may store the mapping relationship in a form of a table. For example, the first network device stores a first mapping and forwarding, where the first mapping and forwarding includes a correspondence between an identifier of the first interface resource object and each of the target interface identifier and the first identification information, so that the first network device determines, based on the first mapping and forwarding, the identifier of the first interface resource object that corresponds to the first identification information and that exists on the target interface identified by the target interface identifier, where the identifier of the first interface resource object is used to identify the first interface resource object, to further determine the first interface resource object.

S1204. The first network device forwards the first data packet to the second network device by using the first interface resource object.

The first network device may be a headend network device in the forwarding path of the service flow, or may be an intermediate network device in the forwarding path. This is not limited in this embodiment.

If the first network device is an intermediate network device, a data packet received by the first network device from a previous-hop network device carries the first identification information. If the first network device is a headend network device, a data packet received from a terminal device may carry the first identification information. That is, the first identification information may be sent to the first network device by adding the first identification information to the data packet when the terminal device sends the data packet. Alternatively, the data packet sent by the terminal device may not carry the first identification information. In this case, when the first network device that serves as the headend network device receives a second data packet from the terminal device, the second data packet does not carry the first identification information. When determining that the second data packet is associated with a first network slice, the first network device inserts the first identification information into the second data packet based on a correspondence between an identifier of the first network slice and the first identification information, to obtain the first data packet. The correspondence between the identifier of the first network slice and the first identification information may be created by a controller when the network slice is created and delivered to the first network device. In addition, mutual access between different services may be isolated by using the first identification information extended on a data plane. A network device at an ingress of the forwarding path encapsulates the identification when receiving the packet, and checks the identification when the packet is sent from the intermediate network device. This improves a risk-resistance capability and a security guarantee of the network. For example, when attack packets are generated, most attack packets can be eliminated through interface packet checking.

The first identification information may be carried in a packet header of the first data packet. The first identification information may be carried in the packet header of the first data packet in a plurality of manners. Several manners are described below as examples.

In a first manner, both the first identification information and the destination address are carried in the packet header of the first data packet as two pieces of information.

For example, the first identification information may be carried in an extended TLV or a sub-TLV. The first data packet may be an IPv6 packet, or may be an IPv4 packet, or may be an MPLS packet, or may be a packet of another type. This is not limited in this embodiment.

Figure 13:
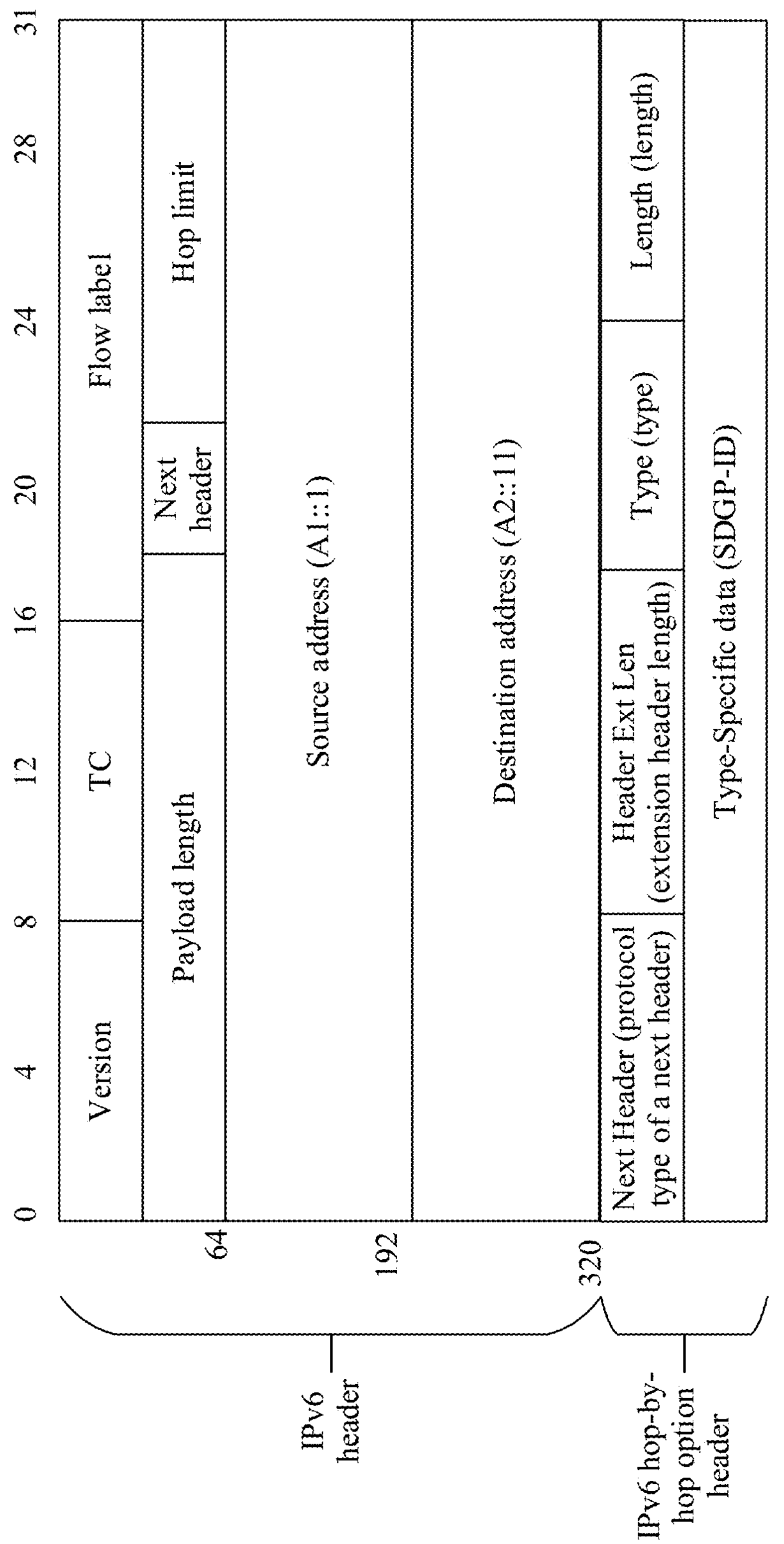
FIG. 13 is a schematic structural diagram of an IPv6 packet that carries an SDGP-ID according to an embodiment.

In an example, the first data packet is an IPv6 packet, and the first identification information (namely, an SDGP-ID) may be carried in an IPv6 hop-by-hop option header of the IPv6 data packet. FIG. 13 is a schematic structural diagram of a packet header, of the IPv6 data packet, that carries the SDGP-ID. A newly added TLV type is used in an extension header of the packet header to carry the SDGP-ID. In FIG. 13, Next Header represents a protocol type of a next packet header, Header Ext Len represents a length of an extension header (excluding a byte occupied by Next Header), Type identifies an option type, a corresponding following type-specific data type-specific data field carries the SDGP-ID, and Length represents a data length of the SDGP-ID.

Figures 14, 15:
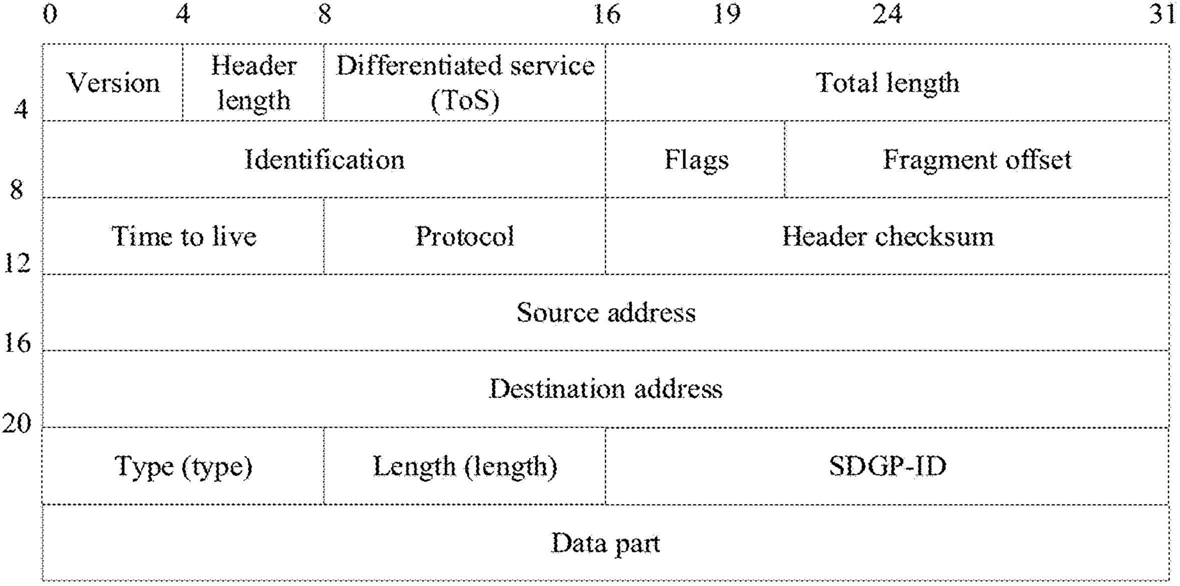
FIG. 14 is a schematic structural diagram of an IPv4 packet that carries an SDGP-ID according to an embodiment.
FIG. 15 is a schematic structural diagram of an MPLS packet according to an embodiment.

In another example, the first data packet is an IPv4 packet. Referring to the structure of the IPv4 packet shown in FIG. 3, the first identification information (namely, the SDGP-ID)

may be carried in an options field of an IPv4 packet header. A self-defined TLV type may be used for Options of the IPv4 packet. Referring to FIG. 14, the self-defined TLV includes Type, Length, and SDGP-ID. Type is used to identify a type of the options field, Length indicates a length of the self-defined TLV, and SDGP-ID is used to indicate an interface resource object used to forward the data packet.

In still another example, the first data packet is an MPLS packet, and the first identification information (namely, the SDGP-ID) may be carried in the MPLS packet as an entropy label. FIG. 15 shows an example of a format of the MPLS packet that carries the SDGP-ID. In FIG. 15, ETH represents a layer 2 Ethernet packet header. A Tunnel label/VPN label/MPLS label is used to identify an outbound interface or a next hop of the forwarding path. A reserved label is used to identify that a lower-layer label of the reserved label is a network slice label. Each hop of network device accesses an SDGP label, identifies a label value of the SDGP label, namely, an SDGP-ID value, queries the interface resource object identified by the SDGP-ID, and forwards the MPLS packet.

Figure 16:
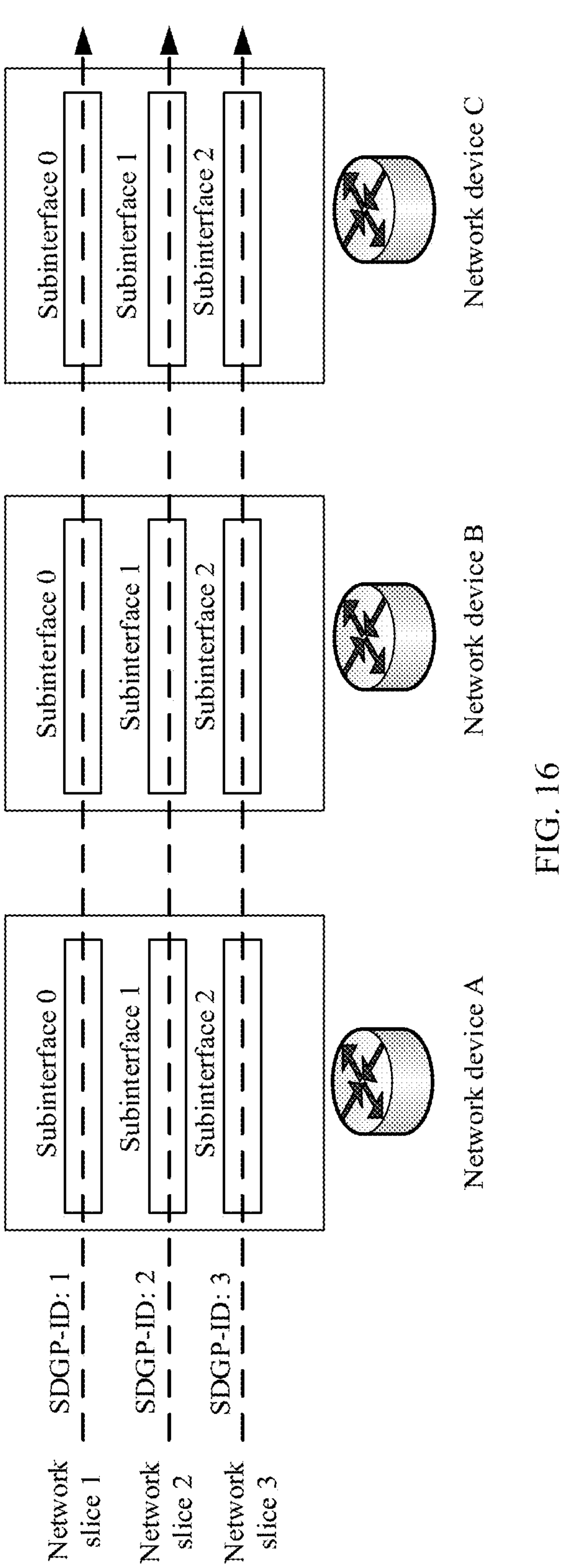
FIG. 16 is a schematic diagram of an SDGP-ID-based packet forwarding process according to an embodiment.

In an example, referring to FIG. 16, a forwarding path is a network device A→a network device B→a network device C. There are three sub-interfaces on each of the network device A, the network device B, and the network device C: a sub-interface 0 (interface 0), a sub-interface 1 (interface 1), and a sub-interface 2 (interface 2). It should be understood that naming manners of sub-interfaces of a same attribute (for example, bandwidth) on different network devices may be the same, or certainly may be different. In FIG. 16, a same naming manner is used as an example. On each network device, the sub-interface 0, the sub-interface 1, and the sub-interface 2 form a binding interface, for example, Trunk0. The sub-interface 0 is a forwarding resource of a network slice 1, the sub-interface 1 is a forwarding resource of a network slice 2, and the sub-interface 2 is a forwarding resource of a network slice 3. The sub-interface 0 corresponds to an SDGP-ID 1, the sub-interface 1 corresponds to an SDGP-ID 2, and the sub-interface 2 corresponds to an SDGP-ID 3. For example, the network device A receives a data packet 1, and searches a routing and forwarding table based on a destination address A in the data packet 1, to determine a binding interface. For example, the destination address A corresponds to outbound Trunk0 in the routing and forwarding table. The network device A then forwards the data packet 1 to the network device B based on outbound Trunk0 and an SDGP-ID in the data packet 1 (for example, the SDGP-ID carried in the data packet 1 is the SDGP-ID 1) by using the forwarding resource of the network slice 1, namely, the sub-interface 0. The network device B determines, in a similar manner, to forward the data packet 1 to the network device C by using the sub-interface 0.

In an example, the interface resource object corresponding to the SDGP-ID may be further associated with a PHB used to forward a service flow. Therefore, when forwarding the data packet by using the interface resource object determined by using the SDGP-ID, the first network device forwards the data packet by using a forwarding behavior indicated by the PHB associated with the interface resource object corresponding to the SDGP-ID. The network device may further add, to the forwarding table through mapping, the PHB used by the interface resource object corresponding to the SDGP-ID, or certainly may store the PHB in an independent table or in another non-table manner.

In a second manner, the first identification information may reuse a destination address field, and the first identification information is carried in the packet header of the first data packet as a part of the destination address.

In an example, an IPv6 packet is used, and the first identification information (SDGP-ID) is extended to a destination address (DA) field of an IPv6 packet header. A location of the SDGP-ID in the DA field is not limited in this embodiment. For ease of description, information used to determine the target interface in the destination address is referred to as routing information. For example, the SDGP-ID may be adjacent to the routing information, or certainly may not be adjacent to the routing information, and the SDGP-ID may be a part of the routing information. For example, the routing information is located in a most significant bit in the DA field, and the first identification information is located in another bit. Certainly, the first identification information may alternatively be located in a most significant bit in the DA field, and the routing information may be located in a least significant bit.

Figure 17A:
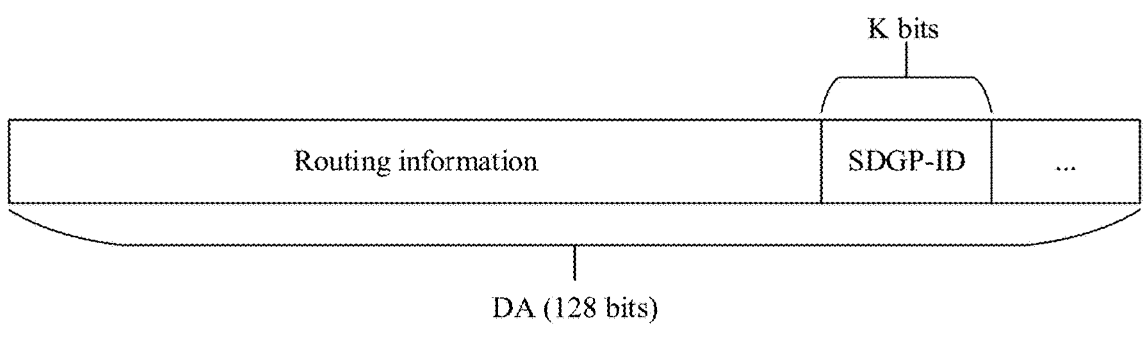
FIG. 17A is a schematic structural diagram of a destination address in an IPv6 packet according to an embodiment.
Figure 17B:
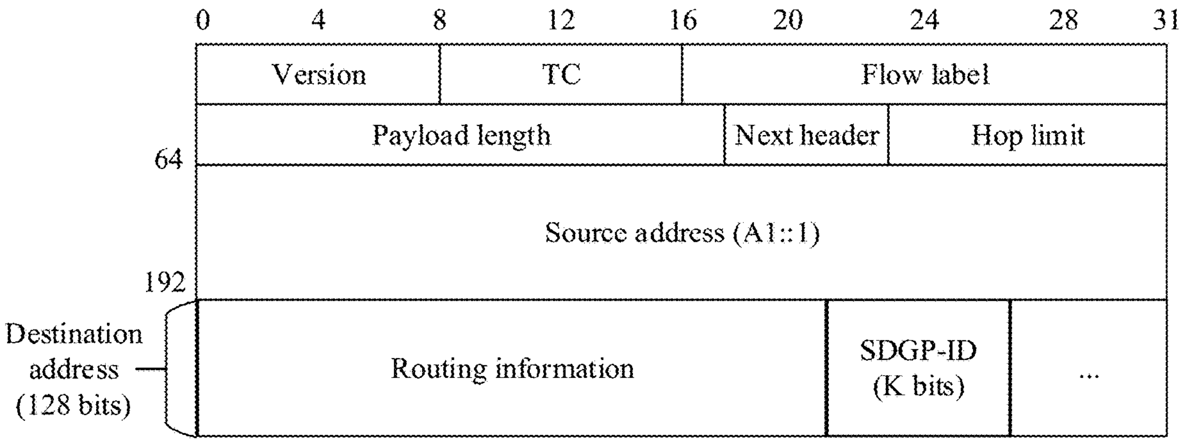
FIG. 17B is a schematic structural diagram of an IPv6 packet according to an embodiment.

For example, as shown in FIG. 17A and FIG. 17B, the IPv6 DA is 128 bits, and several bits in the DA are defined to identify the SDGP-ID.

The forwarding path shown in FIG. 10 is used as an example. For example, a routing table locally maintained by the network device A is shown in Table 2.

TABLE 2

| IPv6 Dest (address) | Exit-Interface | Next-Hop |
|---|---|---|
| c0a8:2048::/32 | Trunk-0 interface set | Network device B |

For example, 16 least significant bits in the destination address are the SDGP-ID. The network device A receives the first data packet, and the DA in the first data packet is c0a8:2048::2. If c0a8:2048::/32 is matched based on a longest IP match rule, a corresponding outbound interface is an outbound interface from A to B, namely, a Trunk0 interface. The 16 least significant bits in the 128 bits in the DA are defined to identify the SDGP-ID, for example, a value of the 16 least significant bits in c0a8:2048::2 is 2. Therefore, the mapping and forwarding is queried based on the SDGP-ID 2. For example, as shown in Table 3, the sub-interface 2 in the Trunk0 interface is determined. That is, the first data packet is forwarded to the network device B by using the sub-interface 2.

TABLE 3

| Out-interface (outbound interface) | SDGP-ID | Sub-interface |
|---|---|---|
| Trunk0 interface (A) | 1 | Interface 1 |
| Trunk0 interface (A) | 2 | Interface 2 |
| Trunk0 interface (A) | 3 | Interface 3 |

Figure 18:
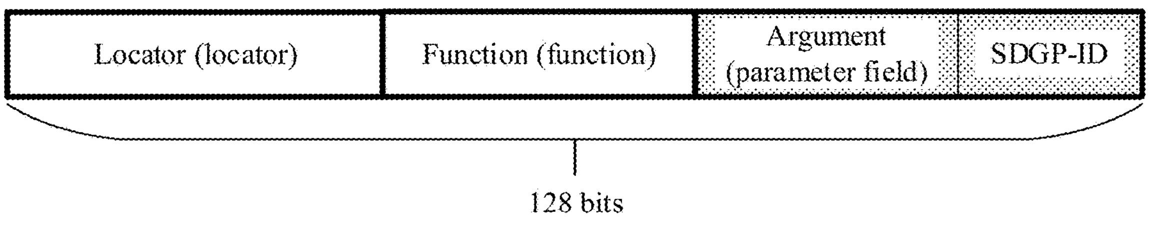
FIG. 18 is a schematic structural diagram of an SID in an SRv6 packet according to an embodiment.

An SRv6 forwarding scenario is used as another example. For example, the IPv6 DA is an SRv6 SID defined in SRv6. Similarly, the foregoing method may be used, and K bits in an extended SRv6 SID format are used to identify the SDGP-ID. FIG. 18 shows an example of a structure of the SRv6 SID. A locator has a locating function. Function indicates an instruction of a device, and is used to indicate a node that generates the SRv6 SID to perform a corresponding function operation. Arguments is an optional parameter field, and is used to define information such as a flow and a service of a packet. For example, the SDGP-ID may be information in Argument, or may be K bits independent of Argument.

Figure 19:
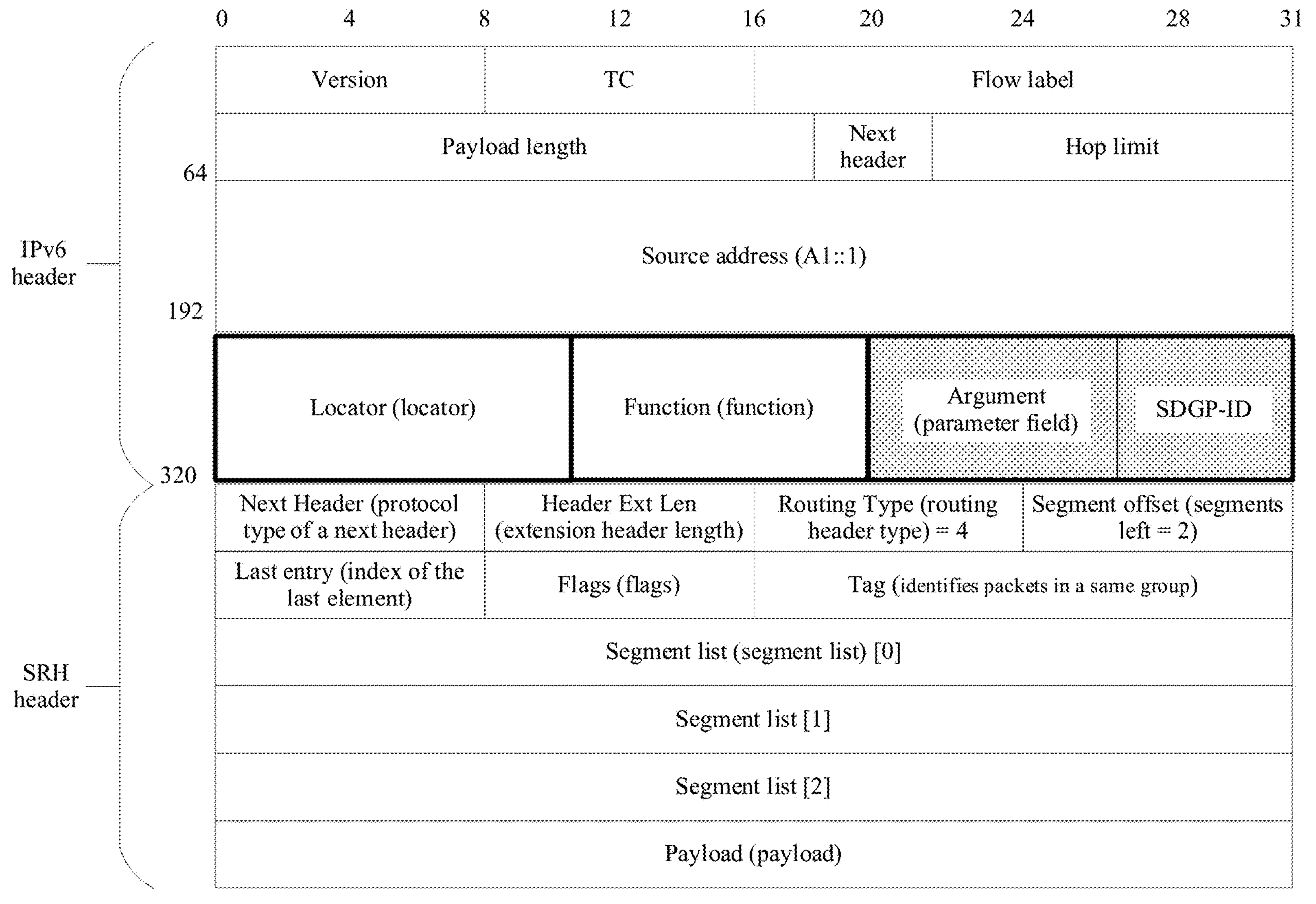
FIG. 19 is a schematic structural diagram of an SRv6 packet according to an embodiment.

FIG. 19 shows an example of a structure of an SRv6 data packet. Next Header represents a type of a packet header immediately following a segment routing header (SRH). Hdr Ext Len represents a length of an SRH header, and is mainly a length occupied by a segment list [0] to a segment list [n]. Routing Type is used to represent a route header type. SRH Type is 4. Segments Left (SL) represents a quantity of intermediate nodes that should be accessed before a destination node is reached. Last Entry represents an index of the last element in the segment list. Flags represents some flags of a data packet. Tag identifies packets in a same group. Segment List [n] represents a segment list. The segment list is encoded from the last segment of the path. The segment list is in a form of an IPv6 address. Segment List [n] is the first segment list to be processed in an SRv6 path, Segment List [n−1] is the second segment list to be processed, Segment List [n−2] is the third segment list to be processed, . . . , and Segment List [0] is the $(n+1)^{th}$ segment list to be processed. Each time an SRv6 node is passed through, the Segments Left (SL) field is decreased by 1, and the IPv6 DA information is changed once. Segments Left and Segments List fields together determine the IPv6 DA information. If an SL value is n (n−0), an IPv6 DA value is a value of Segments List [n]. If the SL value is n−1, the IPv6 DA value is a value of Segments List [n−1]. By analog, if the SL value is 1, the IPv6 DA value is a value of Segments List [1]. If the SL value is 0, the IPv6 DA value is a value of Segments List [0].

When the SRv6 SID is not an SID of a local node, the SRv6 SID is a common IPv6 DA, and the packet is forwarded in a forwarding manner in the foregoing example in which the first identification information reuses the destination address in the IPv6 packet. When the SRv6 SID is the SID of the local node, information about an outbound interface/a next hop is found by querying a forwarding information base (FIB) table (and/or a routing table), a mapping and forwarding, and the like, and then a sub-interface is determined based on carried SDGP-ID information.

In an example, SRv6 data is forwarded based on an End SID and an End.X SID. The End SID represents an endpoint SID, is used to identify a prefix of a destination address in a network, and is globally visible and globally valid in a system. The End.X SID represents an endpoint SID of a layer 3 cross-connection, is used to identify a link in a network, and is globally visible and locally valid.

After receiving the SRv6 data packet, a node first queries a local SID table based on the destination address (SRv6 SID), to determine whether the SRv6 SID corresponding to the destination address is an End SID or an End.X SID. If the SRv6 SID is an End SID, the node continues to query the FIB table (and/or the routing table), queries a target interface corresponding to the SRv6 SID based on the IPv6 FIB table, determines a sub-interface by querying the mapping and forwarding based on the SDGP-ID in the SRv6 SID, and then forwards the data packet by using the determined sub-interface. If the SRv6 SID is an End.X SID, a next hop (outbound interface) of the SRv6 SID is determined without querying the FIB table, the mapping and forwarding is queried based on the SDGP-ID in the SRv6 SID to determine a sub-interface, and then the data packet is forwarded by using the determined sub-interface.

In a third manner, the first identification information may reuse another field in the packet header of the first data packet, for example, a T) field, a flow label field, or a source address field.

Figures 20, 21:
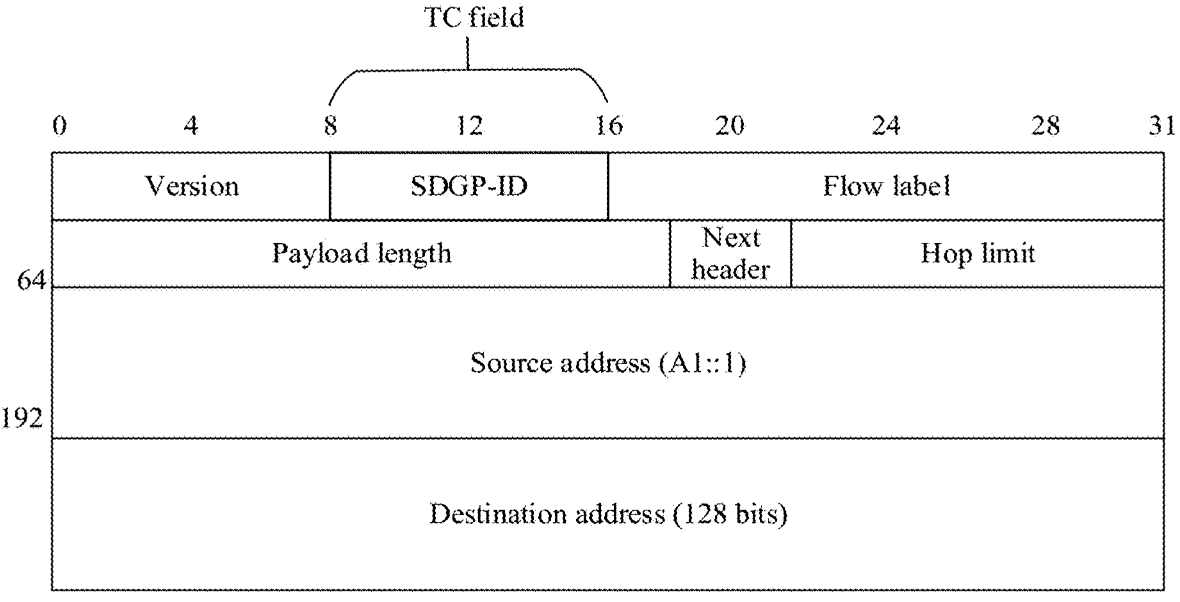
FIG. 20 is another schematic structural diagram of an IPv6 packet according to an embodiment.
FIG. 21 is still another schematic structural diagram of an IPv6 packet according to an embodiment.

In an example, an IPv6 packet is used, and the first identification information reuses the traffic class field. All or a part of the traffic class field may be used to indicate the first identification information. For example, referring to FIG. 20, all of the traffic class field is used to indicate the first identification information. A location of the first identification information in the traffic class field and a quantity of bits occupied by the first identification information are not specifically limited in this embodiment.

After the first network device obtains the first data packet, the first network device determines the target interface based on the destination address in the packet header of the first data packet, then obtains the first identification information from the traffic class field of the packet header, determines the first interface resource object on the target interface based on the first identification information, and then forwards the first data packet by using the first interface resource object.

In another example, an IPv6 packet is used, and the first identification information reuses the flow label field. All or a part of the flow label field may be used to indicate the first identification information. For example, referring to FIG. 21, a part of the flow label field is used to indicate the first identification information. For example, a most significant bit in the flow label field is used to indicate flow label information, and a least significant bit is used to indicate the first identification information. For another example, a least significant bit in the flow label field is used to indicate flow label information, and a most significant bit is used to indicate the first identification information. A location of the first identification information in the flow label field and a quantity of bits occupied by the first identification information are not specifically limited in this embodiment.

After the first network device obtains the first data packet, the first network device determines the target interface based on the destination address in the packet header of the first data packet, then obtains the first identification information from the flow label field of the packet header, determines the first interface resource object on the target interface based on the first identification information, and then forwards the first data packet by using the first interface resource object.

The following provides description by using an example in which the SDGP-ID corresponds to a plurality of interface resource objects. The SDGP-ID is combined with a DS model for QoS to indicate a forwarding policy of a specific service flow. Different forwarding policies indicate one or more interface resource objects on an interface of a network device, and indicate a forwarding behavior of the interface resource object.

When creating a network slice based on network slice requirement information, the controller configures an SDGP-ID for the network slice, and configures an interface resource object for the network slice. The controller makes a configuration that the SDGP-ID may correspond to a plurality of interface resource objects. Different SDGP-IDs may correspond to a same interface resource object. The interface resource object corresponding to the SDGP-ID is associated with a PHB used to forward a service flow. It should be noted that PHBs associated with a same interface resource object corresponding to different SDGP-IDs may be different. That is, one interface resource object that belongs to different network slices may correspond to different PHBs for different network slices. Different PHBs correspond to different forwarding behaviors, and different forwarding behaviors provide different service levels. The SDGP-ID 1 is used as an example. The SDGP-ID 1 corresponds to N interface resource objects on the target interface, where N is an integer greater than 1. In the entire network, the interface resource object may be identified by using a resource ID (Resource-ID, Res-ID). When sending information about the network slice to the target network device, the controller sends a mapping relationship between the SDGP-ID and the N interface resource objects and a mapping relationship between the resource ID and an interface resource object on the target network device to the target network device. A plurality of interface resource objects configured by the controller for each SDGP-ID and a PHB used by each interface resource object corresponding to the SDGP-ID may be considered as a forwarding policy and delivered to each target network device. In an example, the mapping relationship between the SDGP-ID and the N interface resource objects and the mapping relationship between the resource ID and the interface resource object on the target network device may be sent by the controller to the target network device as a part of the information about the network slice. It may be understood that different SDGP-IDs correspond to different network slices, so that the controller can send a correspondence between an SDGP-ID and an identifier of a network slice to the target network device, and the target network device floods the correspondence in the entire network. Alternatively, the controller distributes the correspondence between an SDGP-ID and an identifier of a network slice to each network device in a network topology corresponding to the network slice.

Three network slices are used as an example. An SDGP-ID 1 corresponds to a network slice 1, an SDGP-ID 2 corresponds to a network slice 2, and an SDGP-ID 3 corresponds to a network slice 3.

The network slice 1 is a high-priority network slice, and provides a forwarding service with a low packet loss rate, a low latency, low jitter, and determined bandwidth. For the network slice 1, average bandwidth is 25 G, and peak bandwidth is 50 G. To ensure quality of service of the slice, the slice allocates a resource based on peak traffic, and bandwidth of the slice is set to 50 G.

The network slice 2 is a low-priority network slice, and provides a service with a relatively low latency, a low packet loss rate, and high reliability. For the network slice 2, average bandwidth is 10 G, and peak bandwidth is 20 G. The slice allocates a resource based on average traffic, and bandwidth of the slice is set to 10 G.

The network slice 3 is a low-priority network slice, and provides a service with a relatively low latency, a low packet loss rate, and high reliability. For the network slice 3, average bandwidth is 5 G, and peak bandwidth is 10 G. The slice allocates a resource based on average traffic, and bandwidth of the slice is set to 5 G.

Figures 22, 23:
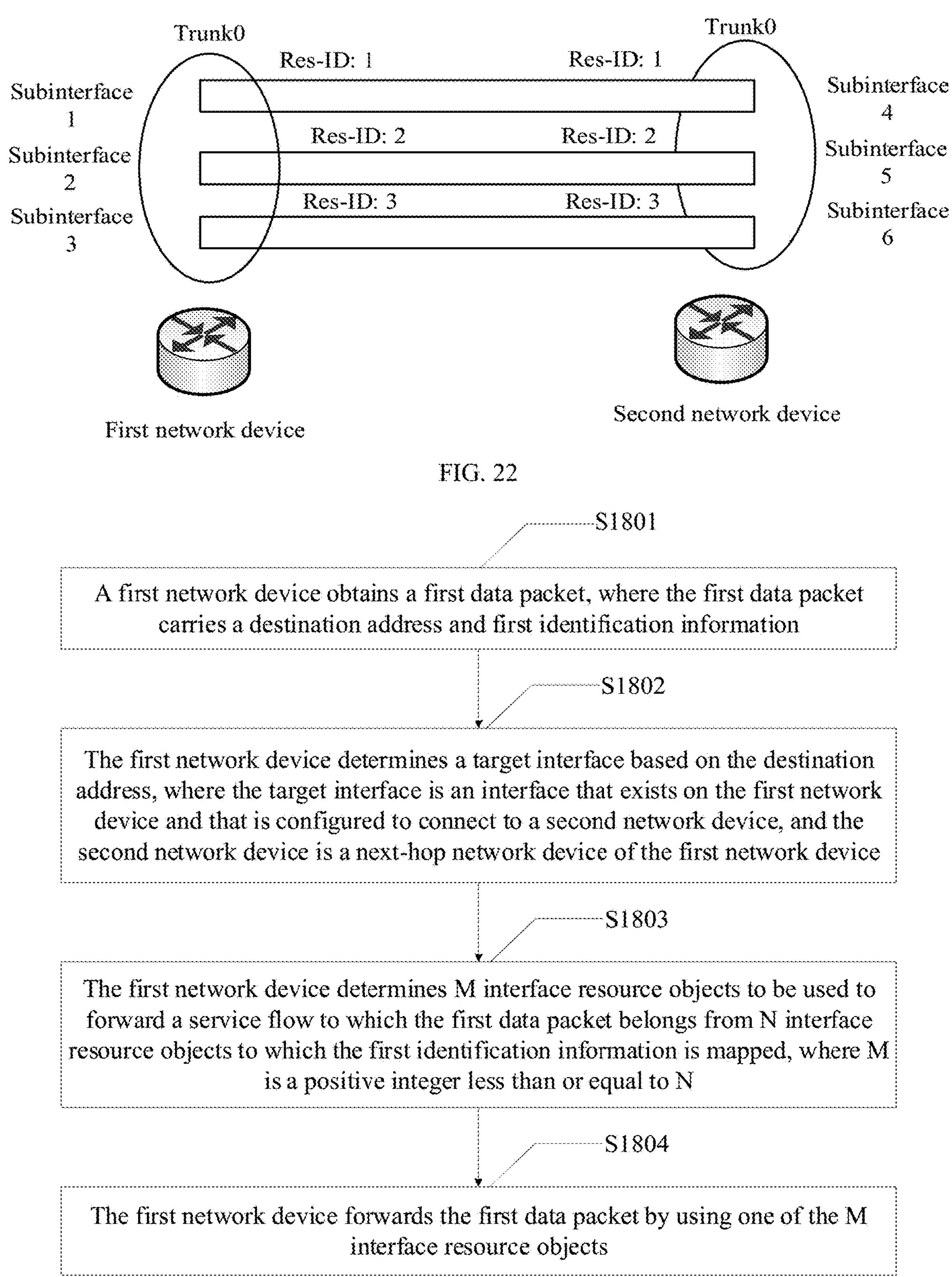
FIG. 22 is a schematic diagram of a mapping relationship between a resource ID and a sub-interface according to an embodiment.
FIG. 23 is another schematic diagram of a data packet forwarding procedure according to an embodiment.

For example, the interface resource object is a sub-interface. Referring to FIG. 22, there are three sub-interfaces on each of the first network device and the second network device. The three sub-interfaces on the first network device are respectively a sub-interface 1, a sub-interface 2, and a sub-interface 3. The three sub-interfaces on the second network device are respectively a sub-interface 4, a sub-interface 5, and a sub-interface 6. The three sub-interfaces on the first network device are respectively connected to the three sub-interfaces on the second network device, as shown in a connection relationship of FIG. 22. The sub-interface 1 is connected to the sub-interface 4, and 50 G bandwidth is provided. The sub-interface 2 is connected to the sub-interface 5, and 10 G bandwidth is provided. The sub-interface 3 is connected to the sub-interface 6, and 5 G bandwidth is provided. Bandwidth corresponding to each sub-interface may be planned during network configuration, or bandwidth of each sub-interface may be planned by the controller during network topology planning.

Different forwarding policies are provided for different network slices based on requirements of the network slices and the bandwidth of the sub-interface on the network device.

For example, the network slice 1 allocates a bandwidth resource based on the peak traffic, to ensure a reliable service for a high-priority service. The network slice 1 may use the sub-interface 1 of the first network device and the sub-interface 4 of the second network device as forwarding resources, and may use an EF forwarding behavior. The network slice 2 allocates a bandwidth resource based on the average traffic, to provide a reliable service for most service flows. The network slice 2 may use the sub-interface 2 of the first network device and the sub-interface 5 of the second network device as forwarding resources. When traffic of a service flow exceeds average interface bandwidth, a traffic part that exceeds traffic of the average interface bandwidth may be forwarded by using the sub-interface 1 and the sub-interface 4, and may be forwarded by lowering a service level, for example, is forwarded in an AF manner. The network slice 3 allocates a bandwidth resource based on the average traffic, to provide a reliable service for most service flows. When traffic of a service flow exceeds the average traffic, a traffic part that exceeds the average traffic may be forwarded by using the sub-interface 2 and the sub-interface 5, and may be forwarded by lowering a service level, for example, forwarded in a BE manner.

Based on this, it may be configured that forwarding policies are respectively configured for different SDGP-IDs. The forwarding policy includes a sub-interface corresponding to each SDGP-ID and a PHB used by the sub-interface corresponding to the SDGP-ID. For example, forwarding policies corresponding to different SDGP-ID may be:

SDGP-ID 1: Sub-interface 1 of the first network device and sub-interface 4 of the second network device, QoS: EF;

SDGP-ID 2: (Sub-interface 2 of the first network device and sub-interface 5 of the second network device, QoS: EF)+(Sub-interface 1 of the first network device and sub-interface 4 of the second network devic+QoS: AF); and SDGP-ID 3: (Sub-interface 3 of the first network device and sub-interface 6 of the second network device+QoS: EF+(Sub-interface 2 of the first network device and sub-interface 5 of the second network devic+QoS: BE).

When the sub-interface is identified by using the resource ID, sub-interfaces with a same attribute on different network devices use a same resource ID. That is, if there is one forwarding path between two network devices, the resource ID is used to identify a sub-path in the forwarding path between the network devices. For example, referring to FIG. 22, a resource ID 1 identifies a sub-path between the sub-interface 1 and the sub-interface 4, a resource ID 2 identifies a sub-path between the sub-interface 2 and the sub-interface 5, and a resource ID 3 identifies a sub-path between the sub-interface 3 and the sub-interface 6. In this case, the forwarding policies may be expressed as follows:

SDGP-ID 1: Res-ID 1 + QoS: EF;
SDGP-ID 2: (Res-ID 2 + QoS: EF) + (Res-ID 1 + QoS: AF); and
SDGP-ID 3: (Res-ID 3 + QoS: EF) + (Res-ID 2 + QoS: BE).

The target network device receives the forwarding policy delivered by the controller. That is, the target network device may establish a mapping and forwarding table after receiving the mapping relationship between the SDGP-ID and the N interface resource objects and the mapping relationship between the resource ID and the interface resource objects on the target network device. For example, the interface resource object is a sub-interface. For example, referring to FIG. 22, the three sub-interfaces on the first network device form a binding interface, and the three sub-interfaces on the second network device form a binding interface. For example, the binding interface is a trunk interface. On a forwarding plane of the first network device, a mapping and forwarding is generated and maintained based on a correspondence between the sub-interface and each of the trunk interface, the SDGP-ID, and the Res-ID, as shown in Table 4. On a forwarding plane of the second network device, a mapping and forwarding is generated and maintained based on a correspondence between the sub-interface and each of the trunk interface, the SDGP-ID, and the Res-ID, as shown in Table 5.

TABLE 4

| Out-interface (outbound interface) | SDGP-ID | Res-ID | Sub-interface |
|---|---|---|---|
| Trunk0 interface (A) | 1 | 1 | Interface 1 |
| Trunk0 interface (A) | 2 | 2 | Interface 2 |
| | | 1 | Interface 1 |
| Trunk0 interface (A) | 3 | 3 | Interface 3 |
| | | 2 | Interface 2 |

TABLE 5

| Out-interface (outbound interface) | SDGP-ID | Res-ID | Sub-interface |
|---|---|---|---|
| Trunk0 interface (A) | 1 | 1 | Interface 4 |
| Trunk0 interface (A) | 2 | 1 | Interface 4 |
| | | 2 | Interface 5 |
| Trunk0 interface (A) | 3 | 2 | Interface 5 |
| | | 3 | Interface 6 |

It should be understood that the mapping and forwarding shown in Table 4 or Table 5 is merely used as an example. On a forwarding plane of the target network device, a plurality of tables are generated and maintained based on the correspondence between the sub-interface and each of the trunk interface, the SDGP-ID, and the Res-ID. For example, the mapping relationship corresponding to Table 4 may alternatively be established in manners of Table 6 and Table 7.

TABLE 6

| Out-interface (outbound interface) | SDGP-ID | Res-ID |
|---|---|---|
| Trunk0 interface (A) | 1 | 1 |
| Trunk0 interface (A) | 2 | 1 |
| | | 2 |
| Trunk0 interface (A) | 3 | 2 |
| | | 3 |

TABLE 7

| Res-ID | Sub-interface |
|---|---|
| 1 | Interface 1 |
| 2 | Interface 2 |
| 3 | Interface 3 |

In an example, the target network device may add, to the forwarding table through mapping, the PHB used by the sub-interface corresponding to the SDGP-ID, or certainly may store the PHB in an independent table or in another non-table manner. This is not specifically limited in this disclosure. For example, when establishing the mapping and forwarding table shown in Table 1, the first network device may add, to the mapping and forwarding table, the PHB used by the sub-interface corresponding to the SDGP-ID, as shown in Table 8.

TABLE 8

| Out-interface (outbound interface) | SDGP-ID | Res-ID | PHB | Sub-interface |
|---|---|---|---|---|
| Trunk0 interface (A) | 1 | 1 | EF | Interface 1 |
| Trunk0 interface (A) | 2 | 2 | EF | Interface 2 |
| | | 1 | AF | Interface 1 |
| Trunk0 interface (A) | 3 | 3 | EF | Interface 3 |
| | | 2 | BE | Interface 2 |

Another procedure of forwarding a service flow by a network device is described below by using an example.

(1) A first network device obtains a first data packet, where the first data packet carries routing information and first identification information.

(2) The first network device determines a target interface based on the routing information, where the target interface is an interface that exists on the first network device and that is configured to connect to a second network device, and the second network device is a next-hop network device of the first network device.

(3) The first network device determines at least one interface resource object on the target interface based on the first identification information.

(4) The first network device forwards the first data packet to the second network device by using the at least one interface resource object.

In a specific implementation, the routing information and the first identification information are carried in the first data packet as two separate pieces of information. For example, the routing information is a destination address. Specifically, a manner of determining the target interface based on the destination address and a manner of determining the interface resource object based on the first identification information are described above. Details are not described herein.

In an example, a packet header of the first data packet includes the destination address and the first identification information.

In another example, the packet header of the first data packet includes an extended TLV, and the extended TLV includes the destination address and the first identification information.

In still another example, the first identification information is included in the packet header of the first data packet as an entropy label.

In another specific implementation, the first identification information may reuse a destination address, and a part of the destination address is used to indicate the first identification information.

In an example, a packet header of the first data packet includes the destination address, and the destination address includes the routing information and the first identification information. For example, the routing information occupies a most significant bit in the destination address, and the first identification information occupies a least significant bit in the destination address. For another example, the routing information occupies a least significant bit in the destination address, and the first identification information occupies a most significant bit in the destination address.

In still another specific implementation, the first identification information reuses a traffic class field. For example, a packet header of the first data packet includes the destination address (the routing information) and the traffic class field, and the traffic class field includes the first identification information.

In yet another specific implementation, the first identification information reuses a flow label field, a packet header of the first data packet includes the destination address (routing information) and the flow label field, and the flow label includes the first identification information.

In an example, a target network device may further add bandwidth corresponding to each sub-interface to a forwarding table through mapping, or certainly may store the bandwidth in an independent table or in another non-table manner.

For detailed description of a procedure of forwarding a service flow by a network device, refer to FIG. 23.

S1801. A first network device obtains a first data packet, where the first data packet carries a destination address and first identification information. The first data packet is any data packet in a service flow. There is a mapping relationship between the first identification information and N interface resource objects, and N is an integer greater than 1.

For a specific manner of obtaining the first data packet, refer to the description in the embodiment corresponding to FIG. 12. Details are not described herein.

S1802. The first network device determines a target interface based on the destination address, where the target interface is an interface that exists on the first network device and that is configured to connect to a second network device, and the second network device is a next-hop network device of the first network device. For a determining manner, refer to the description in the embodiment corresponding to FIG. 12. Details are not described herein.

S1803. The first network device determines M interface resource objects to be used to forward a service flow to which the first data packet belongs from the N interface resource objects to which the first identification information is mapped, where M is a positive integer less than or equal to N.

S1804. The first network device forwards the first data packet by using one of the M interface resource objects.

When determining the M interface resource objects to be used to forward the service flow to which the first data packet belongs from the N interface resource objects to which the first identification information is mapped, the first network device may determine, based on traffic of the service flow to which the first data packet belongs, the M interface resource objects to be used to forward the service flow to which the first data packet belongs from the N interface resource objects to which the first identification information is mapped.

For example, N is 2. To distinguish between the two interface resource objects, the two interface resource objects are respectively referred to as a primary interface resource object and a secondary interface resource object. In other words, the first identification information corresponds to the primary interface resource object and the secondary interface resource object. The first network device may determine, in the following manner, the M interface resource objects to be used to forward the service flow to which the first data packet belongs from the N interface resource objects to which the first identification information is mapped:

When determining that bandwidth of the primary interface resource object meets a traffic requirement of the service flow to which the first data packet belongs, the first network device determines that the primary interface resource object is to be used to forward the service flow to which the first data packet belongs. In this case, the first network device forwards the first data packet by using the primary interface resource object. When determining that bandwidth of the primary interface resource object does not meet a traffic requirement of the service flow to which the first data packet belongs, the first network device determines that the primary interface resource object and the secondary interface resource object are to be used to forward the service flow to which the first data packet belongs. In this case, the first network device forwards, in an offloading manner, the service flow to which the first data packet belongs, that is, forwards, by using the primary interface resource object and the secondary interface resource object, the service flow to which the first data packet belongs. Whether the first data packet is to be forwarded by using the primary interface resource object or the secondary interface resource object may be determined based on an offloading status, so that the first network device forwards the first data packet by using the primary interface resource object or the secondary interface resource object.

If a controller configures different PHBs for different interface resource objects corresponding to the first identification information, for example, a second PHB is used when the primary interface resource object corresponding to the first identification information is used to forward the service flow, and a third PHB is used when the secondary interface resource object corresponding to the first identification information is used to forward the service flow, when determining that the primary interface resource object is to be used to forward the service flow to which the first data packet belongs, the first network device may forward the first data packet to the second network device by using the second PHB and the primary interface resource object. The second PHB may be any one of EF, AF, BE, and CS.

When determining that the secondary interface resource object and the primary interface resource object are to be used to forward the service flow to which the first data packet belongs, the first network device may separately forward, by using the second PHB and the primary interface resource object and by using the third PHB and the secondary interface resource object, the service flow to which the first data packet belongs. The second PHB may be any one of EF, AF, BE, and CS, or the third PHB may be any one of EF, AF, BE, and CS. A service level of the PHB corresponding to the primary interface resource object is usually higher than a service level of the secondary interface resource object. For example, the second PHB may be EF, and the third PHB is AF. When the service flow is forwarded in the offloading manner, the primary interface resource object uses EF to ensure a reliable service for most content of the service flow, and the other part of content is forwarded in an AF manner after a service level is lowered. For another example, the second PHB is EF, and the third PHB is BE. When the service flow is forwarded in the offloading manner, the primary interface resource object uses EF to ensure a reliable service for most content of the service flow, and the other part of content is forwarded in a BE manner after a service level is lowered.

Continuing with the example shown in FIG. 22, the mapping and forwarding table that is shown in Table 6 and that is configured by the first network device is used as an example.

If the service flow 1 of the network slice 1 carries an SDGP-ID value 1, a procedure of processing the service flow 1 by the first network device is as follows:

A1. The first network device receives a data packet 1 that carries an SDGP-ID, and queries a local routing table by using a destination address to obtain an outbound interface/a next hop, for example, Trunk0, where the next-hop network device is the second network device.

A2. The first network device parses the data packet 1, and queries the mapping and forwarding table (Table 6) to determine that the SDGP-ID 1 corresponds to an Res-ID 1 and a PHB of EF.

A3. The first network device modifies a PHB in a TC field of the data packet 1 to EF.

A4. The first network device queries the mapping and forwarding table (Table 6) based on the outbound interface and the Res-ID 1, to obtain a sub-interface 1.

A5. The first network device may forward the data packet 1 whose TC field is modified to the next-hop network device, namely, the second network device, by using a forwarding behavior corresponding to EF and the sub-interface 1.

The service flow 2 of the network slice 2 carries an SDGP-ID value 2. A processing procedure on a network device side is as follows (a resource of the network slice 2 is 10 G, and it is assumed that a current traffic value is 15 G):

B1. The first network device receives a data packet 2 that carries an SDGP-ID, and queries a local routing table by using a destination address to obtain an outbound interface/a next hop Eth-Trunk0, where the next-hop network device is the second network device.

B2. The first network device parses the data packet 2, and queries the mapping and forwarding table (Table 6) to determine that the SDGP-ID 2 corresponds to an Res-ID 2 and a PHB of EF and further corresponds to an Res-ID 1 and a PHB of AF.

B3. The first network device modifies a PHB in a TC field of the data packet 2 to EF.

B4. The first network device queries the mapping and forwarding (Table 6) based on the outbound interface and the Res-ID 2, to obtain a sub-interface 2.

B5. The first network device forwards the data packet 2 whose TC field is modified to the next-hop network device, namely, the second network device, by using a forwarding behavior corresponding to EF and the sub-interface 2.

B6. The first network device identifies that bandwidth of the current sub-interface 2 does not meet a requirement of the service flow 2, modifies TC fields of some packets in the service flow 2 to AF, and queries the mapping and forwarding (Table 6) by using the outbound interface and the Res-ID 1, to obtain a sub-interface 1.

B7. The first network device may forward some packets, in the service flow, whose TC fields are modified to the next-hop network device, namely, the second network device, by using a forwarding behavior corresponding to EF and the sub-interface 1.

It may be learned from the foregoing description that the sub-interface 1 is used to forward the service flows of both the network slice 1 and the network slice 2. The sub-interface 1 provides the EF forwarding behavior for the network slice 1, and the sub-interface 1 provides absolute priority queue scheduling for the service flow of the network slice 1, to ensure bandwidth and a latency of the service flow. The sub-interface 1 provides the AF forwarding behavior for the network slice 2. The sub-interface 1 provides a forwarding quality guarantee for traffic that does not exceed an interface resource bandwidth limit, and does not discard traffic that exceeds the limit but continues to forward the traffic after a service level is lowered.

The service flow 3 of the network slice 3 carries an SDGP-ID value 3. A processing procedure on the first network device is as follows (a resource of the slice 3 is 10 G, and it is assumed that a current traffic value is 10 G):

C1. The first network device receives a data packet 3 that carries an SDGP-ID, and queries a local routing table by using a destination address to obtain an outbound interface/a next hop Eth-Trunk0, where the next-hop network device is the second network device.

C2. The first network device parses the data packet 3, and queries the mapping and forwarding table (Table 6) to determine that the SDGP-ID 3 corresponds to an Res-ID 3 and a PHB of EF and further corresponds to an Res-ID 2 and a PHB of AF.

C3. The first network device modifies a PHB in a TC field of the data packet 3 to EF.

C4. The first network device queries the mapping and forwarding (Table 6) based on the outbound interface and the Res-ID 3, to obtain a sub-interface 3.

C5. The first network device forwards the data packet 3 whose TC field is modified to the next-hop network device, namely, the second network device, by using a forwarding behavior corresponding to EF and the sub-interface 3.

C6. The first network device identifies that bandwidth of the current sub-interface 3 does not meet a requirement of the service flow 3, modifies TC fields of some packets in the service flow 3 to BE, and queries the mapping and forwarding (Table 6) by using the outbound interface and the Res-ID 2, to obtain a sub-interface 2.

C7. The first network device may forward some packets, in the service flow, whose TC fields are modified to the next-hop network device, namely, the second network device, by using a forwarding behavior corresponding to BE and the sub-interface 2.

The sub-interface 2 is used to forward the service flows of both the network slice 2 and the network slice 3. The sub-interface 2 provides the EF forwarding behavior for the network slice 2, and the sub-interface 2 provides absolute priority queue scheduling for the service flow of the network slice 2, to ensure bandwidth and a latency of the service flow. The sub-interface 2 provides the BE forwarding behavior for the network slice 3, and the sub-interface 2 provides the best-effort forwarding behavior for the service flow of the network slice 3. If the sub-interface 2 runs at full load for a long time, the data packets of the network slice 3 may be lost.

The SDGP-ID is used to identify a forwarding policy of a service flow. Different network slices may share a same forwarding resource. The forwarding resource mainly serves a specific network slice. When the forwarding resource is idle, the forwarding resource is used to provide a corresponding forwarding quality guarantee for a service flow of another network slice while forwarding quality of a service flow of the main network slice is ensured, thereby fully using network resources.

Figure 24:
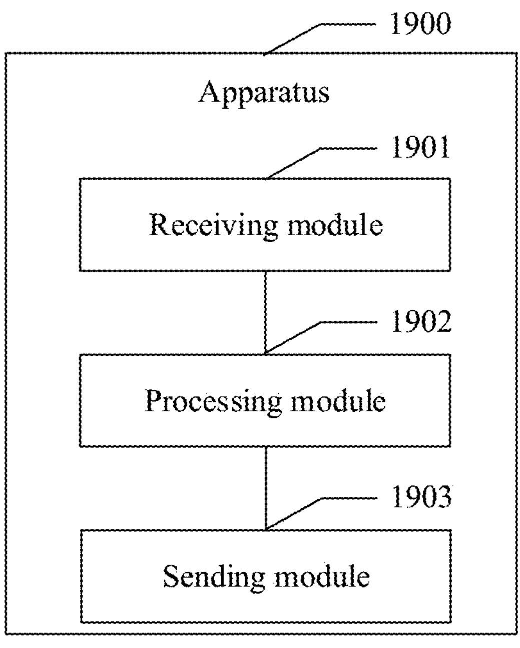
FIG. 24 is a schematic structural diagram of an apparatus 1900 according to an embodiment.

Based on a same processing principle as the method embodiment, an embodiment further provides an apparatus 1900, as shown in FIG. 24. The apparatus 1900 is applied to a network device. The network device may be the network device in the embodiments shown in FIG. 6, FIG. 10 to FIG. 12, FIG. 16, FIG. 22, and FIG. 23, and may be f configured to perform actions of the network device in the foregoing method embodiments. The apparatus 1900 may include a receiving module 1901, a processing module 1902, and a sending module 1903. The apparatus 1900 may be specifically a processor, a chip, a chip system, or the like in the network device. The processing module 1902 is configured to: control and manage an action of the apparatus 1900. The receiving module 1901 is configured to receive information or a packet. The sending module 1903 is configured to send information or a packet. The processing module 1902 is configured to process the information or the packet received by the receiving module 1901.

For example, the apparatus is applied to a first network device. In an implementation scenario, the processing module 1902 is configured to: obtain a first data packet, where the first data packet carries a destination address and first identification information; determine a target interface based on the destination address, where the target interface is an interface that exists on the first network device and that is configured to connect to a second network device, and the second network device is a next-hop network device of the first network device; and determine at least one interface resource object on the target interface based on the first identification information.

For specific implementation of determining, by the processing module 1902, the target interface based on the destination address, refer to the processing process of step S1202 in the embodiment shown in FIG. 12. Details are not described herein.

For specific implementation of determining, by the processing module 1902, the at least one interface resource object on the target interface based on the first identification information, refer to the processing process of step S1203 in the embodiment shown in FIG. 12 or the processing process of step S1803 in the embodiment shown in FIG. 23. Details are not described herein.

The sending module 1903 is configured to forward the first data packet to the second network device by using the at least one interface resource object.

For specific implementation of forwarding, by the sending module 1903, the first data packet to the second network device by using the at least one interface resource object, refer to the processing process of step S1204 in the embodiment shown in FIG. 12 or the processing process of step S1804 in the embodiment shown in FIG. 23. Details are not described herein.

In a specific implementation, the processing module 1902 is further configured to determine a target interface identifier corresponding to the destination address based on a routing and forwarding table. The routing and forwarding table includes a correspondence between the destination address and the target interface identifier, and the target interface identifier is used to identify the target interface.

In a specific implementation, there is a one-to-one mapping relationship between the first identification information and a first interface resource object on the target interface; and the processing module 1902 is further configured to determine the first interface resource object corresponding to the first identification information based on the mapping relationship.

In a specific implementation, the first network device stores a first mapping and forwarding table, and the first mapping and forwarding table includes a correspondence between an identifier of the first interface resource object and each of the target interface identifier and the first identification information; and the processing module 1902 is further configured to determine, based on the first mapping and forwarding table, the identifier of the first interface resource object that corresponds to the first identification information and that is on the target interface identified by the target interface identifier, where the identifier of the first interface resource object is used to identify the first interface resource object. For a specific manner of constructing the first mapping and forwarding table, refer to the description in the embodiment shown in FIG. 6. Details are not described herein.

In a specific implementation, a first PHB is used when the first interface resource object is used to forward a service flow; and the processing module 1902 is further configured to: after determining the first interface resource object corresponding to the first identification information based on the mapping relationship, forward the first data packet to the second network device by using the first PHB and the first interface resource object.

In a specific implementation, there is a mapping relationship between the first identification information and N interface resource objects, and N is an integer greater than 1; and the processing module 1902 is further configured to determine M interface resource objects to be used to forward a service flow to which the first data packet belongs from the N interface resource objects to which the first identification information is mapped, where M is a positive integer less than or equal to N.

In a specific implementation, a PHB used for forwarding the service flow is configured for each of the M interface resource objects; and the processing module 1902 is further configured to: after determining the M interface resource objects to be used to forward the service flow to which the first data packet belongs, forward, by using the PHB configured for each of the M interface resource objects and the M interface resource objects, the service flow to which the first data packet belongs.

In a specific implementation, N is 2, and the first identification information corresponds to a primary interface resource object and a secondary interface resource object; and the processing module 1902 is further configured to: when determining that bandwidth of the primary interface resource object meets a traffic requirement of the service flow to which the first data packet belongs, determine that the primary interface resource object is to be used to forward the service flow to which the first data packet belongs, or when determining that bandwidth of the primary interface resource object does not meet a traffic requirement of the service flow to which the first data packet belongs, determine that the primary interface resource object and the secondary interface resource object are to be used to forward the service flow to which the first data packet belongs.

In a specific implementation, a second PHB is used when the primary interface resource object is used to forward the service flow, and a third PHB is used when the secondary interface resource object is used to forward the service flow; and the processing module 1902 is further configured to: when determining that the primary interface resource object is to be used to forward the service flow to which the first data packet belongs, forward the first data packet to the second network device by using the second PHB and the primary interface resource object, or when determining that the primary interface resource object and the secondary interface resource object are to be used to forward the service flow to which the first data packet belongs, forward the first data packet to the second network device by using the second PHB and the primary interface resource object, or forward the first data packet to the second network device by using the third PHB and the secondary interface resource object.

In a specific implementation, the second PHB is any one of EF, CS, AF, and BE, or the third PHB is any one of EF, CS, AF, and BE.

In a specific implementation, the apparatus further includes: the receiving module 1901 configured to receive a first data packet from a previous-hop network device of the first network device; or receive a first data packet from a terminal device.

In a specific implementation, the first network device is a headend network device in a forwarding path of the first data packet, and the apparatus further includes: the receiving module 1901 configured to receive a second data packet, where the second data packet is associated with a first network slice; and the processing module 1902 is further configured to insert the first identification information into the second data packet based on a correspondence between an identifier of the first network slice and the first identification information, to obtain the first data packet.

In a specific implementation, the target interface is a physical interface, and the interface resource object is a physical sub-interface, a logical sub-interface, or a packet queue; or the target interface is a binding interface, and the interface resource object is a physical interface.

In a specific implementation, the target interface is a binding interface, and the binding interface is configured to establish a neighbor relationship between the first network device and the second network device.

In a specific implementation, a packet header of the first data packet includes the first identification information.

In a specific implementation, the packet header of the first data packet includes an extended TLV, and the extended TLV includes the first identification information.

In a specific implementation, the first identification information is included in the packet header of the first data packet as an entropy label.

In a specific implementation, the interface resource object corresponding to the first identification information is used by the first network slice.

In another implementation scenario, the processing module 1902 is configured to: obtain a first data packet, where the first data packet carries routing information and first identification information; determine a target interface based on the routing information, where the target interface is an interface that exists on the first network device and that is configured to connect to a second network device, and the second network device is a next-hop network device of the first network device; and determine at least one interface resource object on the target interface based on the first identification information.

The sending module 1903 is configured to forward the first data packet to the second network device by using the at least one interface resource object.

In a specific implementation, the routing information is a destination address. The processing module 1902 is further configured to: obtain the destination address from the first data packet, determine the target interface based on the destination address, and then determine the at least one interface resource object on the target interface based on the first identification information in the first data packet.

In a specific implementation, a packet header of the first data packet includes the destination address and the first identification information.

In a possible design, the packet header of the first data packet includes an extended TLV, and the extended TLV includes the destination address and the first identification information.

In a specific implementation, the first identification information is included in the packet header of the first data packet as an entropy label.

In a specific implementation, a packet header of the first data packet includes a destination address, and the destination address includes the routing information and the first identification information. The processing module 1902 is further configured to: obtain the destination address from the first data packet, determine the target interface based on the destination address, obtain the first identification information from the destination address, and determine the at least one interface resource object on the target interface based on the first identification information.

In a specific implementation, the routing information occupies a most significant bit in the destination address, and the first identification information occupies a least significant bit in the destination address; or the routing information occupies a least significant bit in the destination address, and the first identification information occupies a most significant bit in the destination address.

In a specific implementation, a packet header of the first data packet includes a destination address and a traffic class field, and the traffic class field includes the first identification information. The processing module 1902 is further configured to: obtain the destination address from the first data packet, determine the target interface based on the destination address, obtain the first identification information from the traffic class field of the first data packet, and determine the at least one interface resource object on the target interface based on the first identification information.

In a specific implementation, a packet header of the first data packet includes a destination address and a flow label, and the flow label includes the first identification information. The processing module 1902 is further configured to: obtain the destination address from the first data packet, determine the target interface based on the destination address, obtain the first identification information from a flow label field of the first data packet, and determine the at least one interface resource object on the target interface based on the first identification information.

Figure 25:
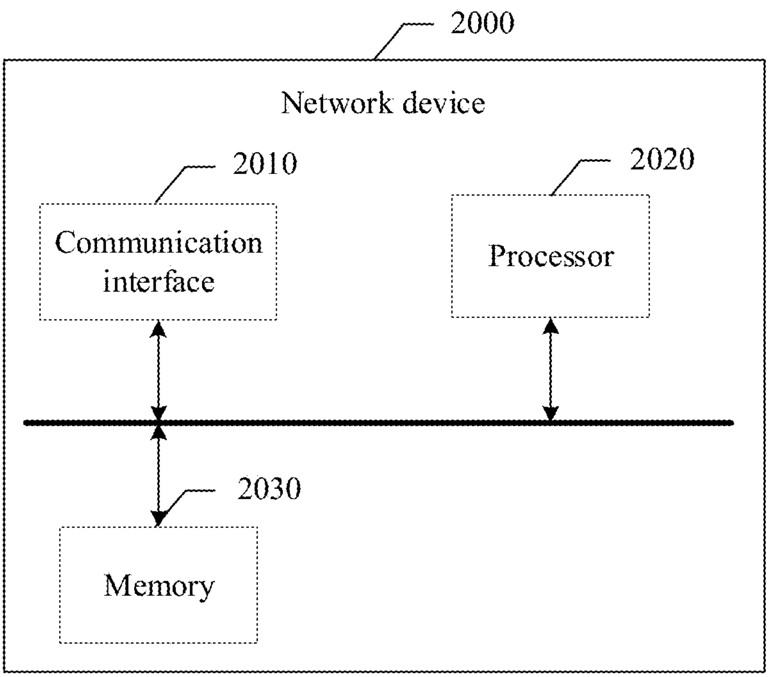
FIG. 25 is a schematic structural diagram of an apparatus 2000 according to an embodiment.

An embodiment further provides a structure of a network device. As shown in FIG. 25, a network device 2000 may include a communication interface 2010 and a processor 2020. The network device 2000 may be the first network device in any one of the foregoing embodiments, for example, the network device in the embodiments shown in FIG. 6, FIG. 10 to FIG. 12, FIG. 16, FIG. 22, and FIG. 23, and may be further configured to perform actions performed by the network device in the embodiments shown in FIG. 6, FIG. 10 to FIG. 12, FIG. 16, FIG. 22, and FIG. 23.

Optionally, the network device 2000 may further include a memory 2030. The memory 2030 may be disposed inside the network device, or may be disposed outside the network device. The processing module 1902 shown in FIG. 24 may be implemented by the processor 2020. The receiving module 1901 and the sending module 1903 may be implemented by the communication interface 2010. A specific connection medium among the communication interface, the processor, and the memory is not limited in this embodiment. In this embodiment, the memory 2030, the processor 2020, and the communication interface 2010 are connected by using a bus in FIG. 25. The bus is represented by using a bold line in FIG. 25. A manner of connection between other components is merely an example for description, and imposes no limitation. The bus may be classified into an address bus, a data bus, a control bus, and the like. For ease of representation, only one thick line is used to represent the bus in FIG. 25, but this does not mean that there is only one bus or only one type of bus.

The processor 2020 sends and receives a packet or a message by using the communication interface 2010, and is configured to implement any method performed by the network device in any one of the foregoing embodiments. In an implementation process, the method performed by the network device (for example, the first network device) in the foregoing method embodiments may be completed by using an integrated logic circuit of hardware or instructions in a form of software in the processor 2020. For brevity, details are not described herein. Program code used by the processor 2020 to implement the foregoing method may be stored in the memory 2030. The memory 2030 is coupled to the processor 2020.

In another implementation, the processor 2020 is configured to: obtain a first data packet, where the first data packet carries routing information and first identification information; determine a target interface based on the routing information, where the target interface is an interface that exists on the first network device and that is configured to connect to a second network device, and the second network device is a next-hop network device of the first network device; determine at least one interface resource object on the target interface based on the first identification information; and forward the first data packet to the second network device by using the at least one interface resource object.

Figure 26:
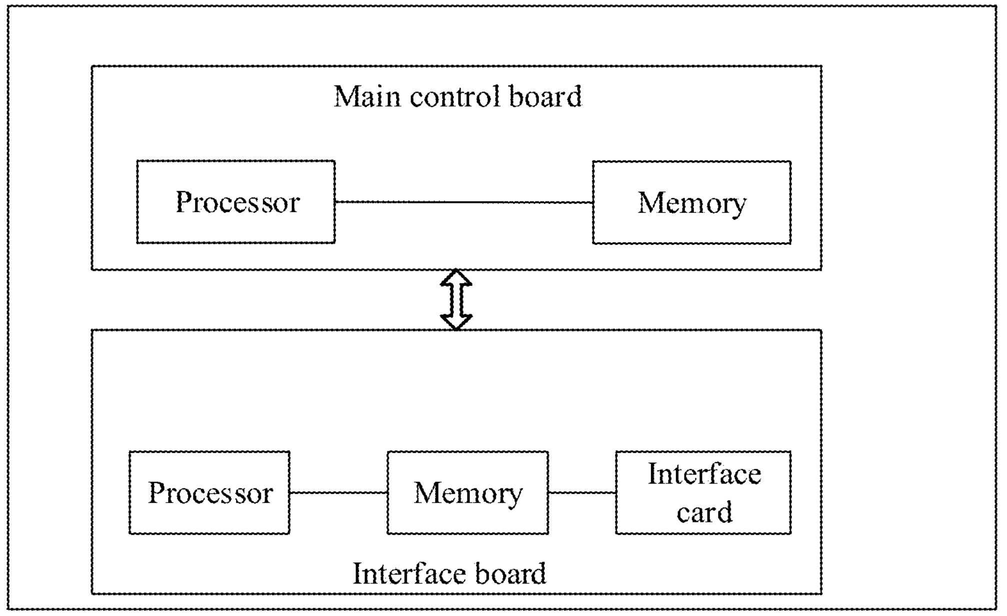
FIG. 26 is a schematic structural diagram of an apparatus 2100 according to an embodiment.

An embodiment further provides a structure of a network device. As shown in FIG. 26, a network device 2100 may include a main control board and an interface board. The main control board and the interface board are included. The main control board includes a processor and a memory, and the interface board includes a processor, a memory, and an interface card. The processor of the interface board is configured to invoke program instructions in the memory of the interface board to receive and send a packet by using the interface card. The processor of the main control board is configured to invoke program instructions in the memory of the main control board to execute corresponding processing functions for a packet.

Figure 27:
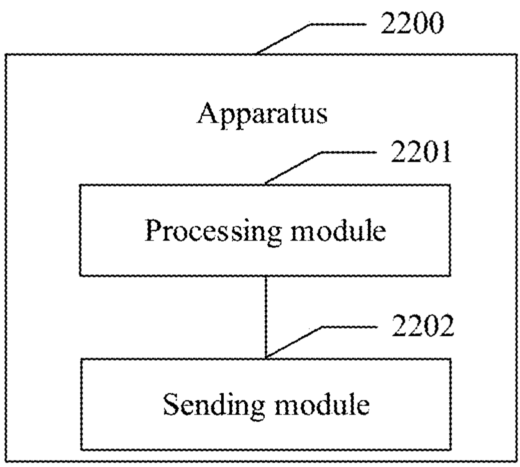
FIG. 27 is a schematic structural diagram of an apparatus 2200 according to an embodiment.

Based on a same concept as the method embodiment, an embodiment further provides an apparatus. Referring to FIG. 27, the apparatus 2200 is applied to a controller. The apparatus 2200 may include a processing module 2201 and a sending module 2202. The apparatus 2200 may be specifically a processor, a chip or a chip system, a function module, or the like in the controller. The processing module 2201 is configured to: control and manage an action of the apparatus 2200. The processing module 2201 is configured to: create a network slice, generate information about the network slice, and so on. The sending module 2202 is configured to send the information about the network slice.

For example, the processing module 2201 is configured to: when creating a first network slice, create a mapping relationship between an identifier of the first network slice and first identification information and a mapping relationship between at least one interface resource object on a target interface on a first network device and the first identification information, where the first network slice can use the at least one interface resource object. For a specific manner of creating the mapping relationship between the identifier of the first network slice and the first identification information and the mapping relationship between the at least one interface resource object on the target interface on the first network device and the first identification information, refer to the related description in the description of the network slice creation process in the foregoing method. Details are not described herein.

The sending module 2202 is configured to send the mapping relationship between the identifier of the first network slice and the first identification information and the mapping relationship between the at least one interface resource object and the first identification information to the first network device.

The target interface is a physical interface, and the interface resource object is a physical sub-interface, a logical sub-interface, or a packet queue, or the target interface is a binding interface, and the interface resource object is a physical interface.

Figure 28:
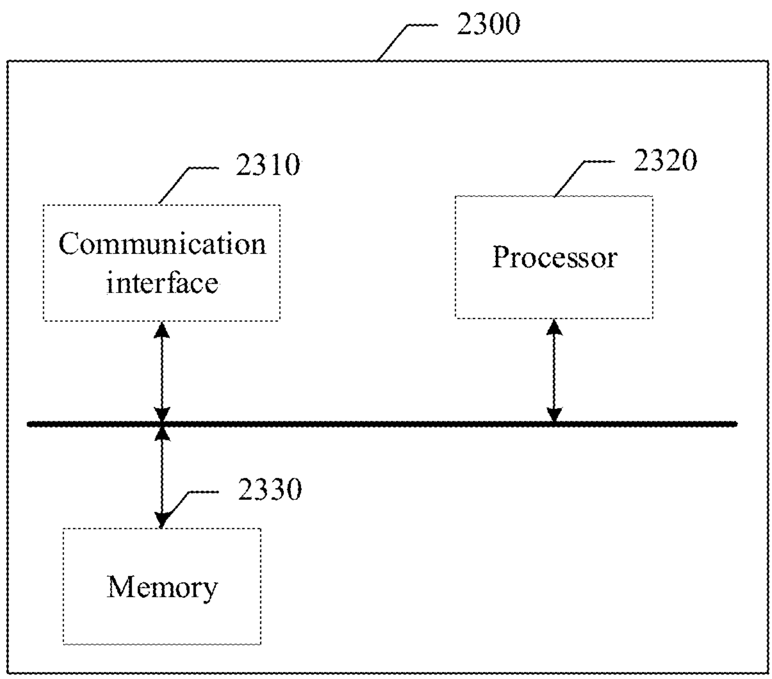
FIG. 28 is a schematic structural diagram of an apparatus 2300 according to an embodiment.

An embodiment further provides a structure of a controller. As shown in FIG. 28, a controller 2300 may include a communication interface 2310 and a processor 2320. The controller 2300 may be the controller in the foregoing method embodiments, and is configured to perform actions of the controller in the foregoing method embodiments. Optionally, the controller 2300 may further include a memory 2330. The memory 2330 may be disposed inside the controller, or may be disposed outside the controller. The processing module 2201 shown in FIG. 27 may be implemented by the processor 2320. The sending module 2202 may be implemented by the communication interface 2310.

In the embodiments, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments. The general-purpose processor may be a microprocessor or any conventional processor or the like. The steps of the method disclosed with reference to the embodiments may be directly performed by a hardware processor, or may be performed by using a combination of hardware in the processor and a software module.

Couplings in this embodiment are indirect couplings or communication connections between apparatuses, or modules, may be implemented in electrical, mechanical, or other forms, and are used for information exchange between the apparatuses, or the modules.

The processor may cooperate with the memory. The memory may be a nonvolatile memory such as a hard disk drive (HDD) or a solid-state drive (SSD), or may be a volatile memory such as a random-access memory (RAM). The memory is any other medium that can carry or store expected program code in a form of an instruction or a data structure and that can be accessed by a computer, but is not limited thereto.

Based on the foregoing embodiments, an embodiment further provides a computer storage medium. The storage medium stores a software program, and when the software program is read and executed by one or more processors, the method provided in any one or more of the foregoing embodiments may be implemented. The computer storage medium may include: any medium that can store program code, for example, a USB flash drive, a removable hard disk, a read-only memory, a random access memory, a magnetic disk, or an optical disc.

A person skilled in the art should understand that the embodiments may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a compact disc read-only memory (CD-ROM), an optical memory, and the like) that include computer usable program code.

This disclosure is described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments without departing from the scope of this disclosure. This disclosure is intended to cover these modifications and variations provided that they fall within the scope of protection defined by the following claims and their equivalent technologies.

What is claimed is:

1. A method implemented by a first network device and comprising:

obtaining a first Internet Protocol version 6 (IPv6) data packet that comprises a destination address (DA) field and a Hop-by-Hop Options header, wherein the DA field comprises a destination address, wherein the Hop-by-Hop Options header comprises identification information, and wherein the identification information is a network-wide unique identifier identifying an interface resource object;

determining a target interface of the first network device based on the destination address in the DA field of the first IPV6 data packet, wherein the target interface is configured to connect to a second network device, and wherein the second network device is a next-hop network device of the first network device;

determining at least one interface resource object of the target interface based on the identification information in the Hop-by-Hop Options header of the first IPV6 data packet; and forwarding the first IPV6 data packet to the second network device using the at least one interface resource object.

2. The method of claim 1, wherein determining the target interface based on the destination address in the DA field of the first IPV6 data packet comprises determining, based on a first correspondence, a target interface identifier identifying the target interface, and wherein the first correspondence is between the destination address and the target interface identifier.

3. The method of claim 1, wherein determining the at least one interface resource object of the target interface comprises determining, based on a second correspondence between the identification information and a first interface resource object, the first interface resource object.

4. The method of claim 1, wherein determining the at least one interface resource object of the target interface comprises determining, based on a third correspondence, an object identifier identifying a first interface resource object, and wherein the third correspondence is among the object identifier, a target interface identifier identifying the target interface, and the identification information.

5. The method of claim 3, further comprising further forwarding the first IPv6 data packet using a first per-hop behavior (PHB).

6. The method of claim 1, wherein determining the at least one interface resource object comprises determining, based on a correspondence between the identification information and N interface resource objects, M interface resource objects from the N interface resource objects, wherein M is less than or equal to N.

7. The method of claim 6, wherein forwarding the first IPv6 data packet comprises forwarding, using per-hop behaviors (PHBs) of the M interface resource objects, a service flow to which the first IPV6 data packet belongs.

8. The method of claim 6, wherein N is 2, wherein the identification information corresponds to a primary interface resource object and a secondary interface resource object, and wherein determining the M interface resource objects comprises:

determining, when a bandwidth of the primary interface resource object meets a traffic requirement of a service flow to which the first IPV6 data packet belongs, to use the primary interface resource object to forward the service flow; and determining, when the bandwidth does not meet the traffic requirement, to use the primary interface resource object and the secondary interface resource object to forward the service flow.

9. The method of claim 8, wherein forwarding the first IPV6 data packet comprises:

further forwarding, when determining to use the primary interface resource object, the first IPv6 data packet using a second per-hop behavior (PHB) and the primary interface resource object; and when determining to use the primary interface resource object and the secondary interface resource object are:

forwarding the service flow to the second network device using the second PHB and the primary interface resource object, and forwarding the service flow to the second network device using a third PHB and the secondary interface resource object.

10. The method of claim 9, wherein the second PHB or the third PHB is expedited forwarding (EF), class selector (CS), assured forwarding (AF), or best-effort (BE).

11. The method of claim 1, wherein obtaining the first IPV6 data packet comprises receiving the first IPV6 data packet from a terminal device or a previous-hop network device of the first network device.

12. The method of claim 1, wherein the first network device is a headend network device in a forwarding path of the first IPV6 data packet, and wherein obtaining the first IPv6 data packet comprises:

receiving a second data packet associated with a network slice; and inserting, based on a correspondence between an identifier of the network slice and the identification information, the identification information into the second data packet to obtain the first IPv6 data packet.

13. The method of claim 1, wherein the target interface is a physical interface and the at least one interface resource object comprises a physical sub-interface, a logical sub-interface, or a packet queue, or wherein the target interface is a binding interface and the at least one interface resource object comprises the physical interface.

14. The method of claim 13, wherein the target interface is the binding interface, and wherein the binding interface is configured to establish a neighbor relationship between the first network device and the second network device.

15. The method of claim 1, wherein the first IPV6 data packet further comprises a packet header, and wherein the packet header comprises the identification information.

16. An apparatus comprising:

a memory configured to store instructions; and a processor coupled to the memory and configured to execute the instructions to cause the apparatus to:

obtain a first Internet Protocol version 6 (IPv6) data packet that comprises a destination address (DA) field and a Hop-by-Hop Options header, wherein the DA field comprises a destination address, wherein the Hop-by-Hop Options header comprises identification information, and wherein the identification information is a network-wide unique identifier identifying an interface resource object;

determine a target interface of a first network device based on the destination address in the DA field of the first IPV6 data packet, wherein the target interface is configured to connect to a second network device, and wherein the second network device is a next-hop network device of the first network device;

determine at least one interface resource object of the target interface based on the identification information in the Hop-by-Hop Options header of the first IPV6 data packet; and forward the first IPV6 data packet to the second network device using the at least one interface resource object.

17. The apparatus of claim 16, wherein the processor is further configured to execute the instructions to cause the apparatus to determine the target interface based on the destination address in the DA field of the first IPV6 data packet by determining, based on a first correspondence, a target interface identifier identifying the target interface, and wherein the first correspondence is between the destination address and the target interface identifier.

18. The apparatus of claim 16, wherein the processor is further configured to execute the instructions to cause the apparatus to further determine a first interface resource object based on a second correspondence between the identification information and the first interface resource object.

19. The apparatus of claim 16, wherein the processor is further configured to execute the instructions to cause the apparatus to determine the at least one interface resource object of the target interface comprises determining, based on a third correspondence, an object identifier identifying a first interface resource object, and wherein the third correspondence is among the object identifier, a target interface identifier identifying the target interface, and the identification information.

20. The apparatus of claim 18, wherein the processor is further configured to execute the instructions to cause the apparatus to further forward the first IPV6 data packet using a first per-hop behavior (PHB).

21. The apparatus of claim 16, wherein the processor is further configured to execute the instructions to cause the apparatus to determine the at least one interface resource object by determining, based on a correspondence between the identification information and N interface resource objects, M interface resource objects from the N interface resource objects, wherein Mis less than or equal to N.

22. The apparatus of claim 21, wherein the processor is further configured to execute the instructions to cause the apparatus to forward the first IPV6 data packet by forwarding, using per-hop behaviors (PHBs) of the M interface resource objects, a service flow to which the first IPv6 data packet belongs.

23. The apparatus of claim 21, wherein N is 2, wherein the identification information corresponds to a primary interface resource object and a secondary interface resource object, and wherein the processor is further configured to execute the instructions to cause the apparatus to determine the M interface resource objects by:

determining, when a bandwidth of the primary interface resource object meets a traffic requirement of a service flow to which the first IPV6 data packet belongs, to use the primary interface resource object to forward the service flow; and determining, when the bandwidth does not meet the traffic requirement, to use the primary interface resource object and the secondary interface resource object to forward the service flow.

24. The apparatus of claim 23, wherein the processor is further configured to execute the instructions to cause the apparatus to forward the first IPV6 data packet by:

further forwarding, when determining to use the primary interface resource object, the first IPv6 data packet using a second per-hop behavior (PHB) and the primary interface resource object; and when determining to use the primary interface resource object and the secondary interface resource object:

forward the service flow to the second network device by using the second PHB and the primary interface resource object, and forward the service flow to the second network device using a third PHB and the secondary interface resource object.

25. The apparatus of claim 16, wherein the processor is further configured to cause the apparatus to obtain the first IPV6 data packet by receiving the first IPV6 data packet from a terminal device or a previous-hop network device of the first network device.

26. The apparatus of claim 16, wherein the processor is further configured to execute the instructions to cause the apparatus to receive a forwarding policy from a controller, wherein the forwarding policy is configured for the identifier information, and wherein the forwarding policy indicates a correspondence between the at least one interface resource object and the identifier information and a indicates per-hop behavior (PHB) used by the at least one interface resource object.

27. The method of claim 1, further comprising receiving a forwarding policy from a controller, wherein the forwarding policy is configured for the identifier information, and wherein the forwarding policy indicates a correspondence between the at least one interface resource object and the identifier information and a indicates per-hop behavior (PHB) used by the at least one interface resource object.

28. A computer program product comprising computer-executable instructions that are stored on a non-transitory computer-readable medium and that, when executed by a processor, cause an apparatus to:

obtain a first Internet Protocol version 6 (IPv6) data packet that comprises a destination address (DA) field and a Hop-by-Hop Options header, wherein the DA field comprises a destination address, wherein the Hop-by-Hop Options header comprises identification information, and wherein the identification information is a network-wide unique identifier identifying an interface resource object;

determine a target interface of a first network device based on the destination address in the DA field of the first IPV6 data packet, wherein the target interface is configured to connect to a second network device, and wherein the second network device is a next-hop network device of the first network device;

determine at least one interface resource object of the target interface based on the identification information in the Hop-by-Hop Options header of the first IPV6 data packet; and forward the first IPV6 data packet to the second network device using the at least one interface resource object.

* * * * *